US008596642B2

(12) United States Patent
Watkins et al.

(10) Patent No.: US 8,596,642 B2
(45) Date of Patent: Dec. 3, 2013

(54) DOMINO GAME

(76) Inventors: Michael Robinson Watkins, Dacula, GA (US); Neal Christopher Allen, Atlanta, GA (US)

( * ) Notice: Subject to any disclaimer, the term of this patent is extended or adjusted under 35 U.S.C. 154(b) by 264 days.

(21) Appl. No.: 12/487,822

(22) Filed: Jun. 19, 2009

(65) Prior Publication Data

US 2009/0315263 A1 Dec. 24, 2009

Related U.S. Application Data

(60) Provisional application No. 61/074,227, filed on Jun. 20, 2008.

(51) Int. Cl.
*A63F 9/20* (2006.01)
*A63F 13/00* (2006.01)

(52) U.S. Cl.
USPC ........... 273/274; 273/275; 273/276; 273/293; 273/309; 463/11

(58) Field of Classification Search
USPC ............. 273/274, 275, 276, 293, 309; 463/11
See application file for complete search history.

(56) References Cited

U.S. PATENT DOCUMENTS

| | | | | |
|---|---|---|---|---|
| 5,938,528 | A * | 8/1999 | Glapion | 463/11 |
| 6,070,876 | A * | 6/2000 | Ko | 273/293 |
| 7,380,792 | B2 * | 6/2008 | Taranino | 273/146 |
| 8,333,644 | B2 * | 12/2012 | Solaja et al. | 463/11 |
| 2004/0026861 | A1 * | 2/2004 | Frieman | 273/302 |
| 2008/0018049 | A1 * | 1/2008 | Hebden | 273/292 |

OTHER PUBLICATIONS

International Search Report; PCT/US2009/047955; Jul. 29, 2009.
Written Opinion; PCT/US2009/047955; Jul. 29, 2009.
Go (Game)—Wikipedia, the free encyclopedia (retrieved Jul. 17, 2009); <URL:http://en.wikipedia.org/w/index.php?title=Go_(game)&oldid=220387800> published on Jun. 19, 2008 as per Wikipedia revision archive; See whole document.
Rules of Domino Games: Equipment for Domino Games (retrieved Jul. 17, 2009); <URL:http://web.archive.org/web/20071029043804/http://www.pagat.com/tile/wdom/equipment.html>; published on Oct. 29, 2007 as per Wayback Engine; See whole document.
Pai Gow Tiles (retrieved Jul. 17, 2009); published on Feb. 7, 2008 as per Wayback Engine <URL:http://web.archive.org/web/20080207202751/http://www.dicedealer.com/pai_gow_tiles1.htm>; See whole document.

* cited by examiner

*Primary Examiner* — Benjamin Layno
(74) *Attorney, Agent, or Firm* — Bernhard P. Molldrem, Jr.

(57) ABSTRACT

A method of playing a domino match is disclosed in which the players of the match play a plurality of domino games, with each game including at least one hand. The players are awarded points throughout the first domino game. The players may risk the awarded points earned throughout the first domino game in a play-by-play side wager against the other players. Players attempt to win the match by being the first player to win two or more games. Additionally, players are rewarded for being the total point winner of the match or tournament.

18 Claims, 2 Drawing Sheets

DOMINO GAME

CROSS REFERENCE TO RELATED APPLICATION

This application claims the benefit of Provisional Patent Application Ser. No. 61/074,227, filed on Jun. 20, 2008, the disclosure of which is hereby incorporated by reference.

FIELD OF THE INVENTION

The subject invention relates to a domino game called BIGSTAKES5, and more specifically a method of playing a domino game and match by a plurality of players using poker chips representing five points apiece for scoring and keeping score and separate chips in denominations of 5, 25, 100, 500, 1000, 5000, 10,000 and 100,000 used for wagering and risking points. The domino match includes a plurality of domino games, with each hand representing a single domino game.

BACKGROUND OF THE INVENTION

There are many known domino game variations. One known variety of a domino game is disclosed on the website www.gamblerspalace.com, and discloses a domino game comprising a set of wagering rules in which players may participate in a risk. Following a general rule set of the domino game, players begin the domino game when a computer turns down a set of numbered bones so that no player may identify any numbered bone within the set of numbered bones. The computer randomizes or mixes up the set of numbered bones. Thereafter, players randomly select a predetermined quantity of numbered bones. Any remaining numbered bones are left unturned to be drawn later if necessary. Play of the domino game begins when the spinner is placed on the playing surface. The players may play off multiple ends of the spinner.

Play generally continues in a clockwise manner with each subsequent player placing a numbered bone on the playing surface. A line is formed as players place complementary numbered bones off the spinner. The numbered bones are placed end to end along the line of numbered bones previously placed. Players may only place numbered bones that have a complementary number to the number displayed on an available end of the line. In the event that a player places a double numbered bone, i.e., a double bone, the double bone is laid perpendicular to the line being formed. If a player lacks a numbered bone with at least one complementary number matching an available end of the line, then the player must randomly draw a numbered bone until a complementary numbered bone is available for play. If no unturned bones remain, players must pass their turn. If all players are forced to pass and play is unable to continue, the game ends.

Following a set of wagering rules of the domino game, players may risk in a side wager on the outcome of the game. Prior to a game, a player may place a side wager with a winning condition that the player wins the overall match by being the first to earn a specific number of points. Players earn points in two methods. The first method is for a player to discard all of his respective numbered bones before any other player. The player that is the first to discard all of their respective numbered bones will receive points based on the values of the numbered bones still held by other players. The second method to earn points occurs throughout game play. As game play progresses, players may place a numbered bone which results in the numbers of the playable ends of the domino line adding up to an integer multiple of the number five. When a player creates a multiple of five with the placement of a numbered bone, the player receives points equal to the multiple of five.

Game play ends and a winner of the game is declared when a player is the first to discard all of his numbered bones or a player is the first to earn a specific number of points. Generally, this process is repeated, as a plurality of games comprise a match of the domino game. The match continues by beginning subsequent games until a player earns a specific number of points.

U.S. Pat. No. 7,380,792 to Taranino discloses a domino game in which a player may choose to risk all or a portion of their points as part of a side game, i.e., a side wager. To win the side wager, the player must satisfy a winning condition independent of a winning condition for the domino game. The side wager is placed prior to the commencement of the domino game and does not affect the outcome of the domino game.

SUMMARY OF THE INVENTION

The subject invention provides a method of playing a domino match. The domino match includes a plurality of domino games, with each hand representing a single domino game. The domino match is played by a plurality of players. The method of playing the domino match comprises the steps of playing a first domino game. The method further comprises the step of awarding a point value to the players based on an individual play during each game satisfying a pre-determined result. The method further comprises the step of determining a winner of the game. The method further comprises the step of awarding a point value to the winner of each game. The method further comprises the step of declaring the first player to receive a point value awarded during the domino game. The method further comprises the step of at least one player wagering at least a portion of the points awarded during the first domino game against at least a portion of the points awarded during the first domino game by at least one other player in a side wager on the outcome of at least one game in at least one subsequent domino game.

Accordingly, the subject invention provides a new and exciting method of playing a domino game that permits the players to win in four different manners. The players may win a single game by scoring more points than any of their opponents; the players may win a single game by scoring more points than any of their opponents and having placed a wager on the outcome can collect the other player's respective wagers; or in a match in a common manner by being the first player to win a pre-determined number of games of the match, and the players may win in a new and exciting manner by being the person awarded the highest point value throughout the course of the games in combination with the side wagers.

In some tournament formats, the first player to attain SET & SLIDE! status, irrespective of the number of points that player scored over the course of the game, is declared the winner of said game. Players are rewarded with additional BONUS points for each game-win in the 5-game set. After ALL game points are tabulated, the player with the highest total is declared the winner.

In one aspect of the present invention, a gaming apparatus having a gaming board and a plurality of gaming tokens is provided. The gaming tokens includes a plurality of house tokens. Each house token has indicia representing an association with one of a plurality of independent players. The gaming board includes a plurality of separate individual playing areas, each associated with one of the players and each having a reward region. Positioning, within the reward region of an individual playing area associated with a given player, of one or more house tokens having indicia representative of another player represents game points awarded during the course of a game to the given player.

Advantageously, this provides a convenient way of tracking the game points accumulated by each player whilst at the same time minimising cheating during game play. As game points can only be represented by receiving house tokens from other players, individual players cannot use their own tokens to accumulate points—they must be awarded points by other players. This is important when the house tokens are to be reset for each game (ready to be awarded) but other types of gaming tokens representative of cumulative winnings are also to be used.

Optionally, each individual playing area includes a house token holding region for holding unawarded house tokens having indicia associated with the player with which that respective individual playing area is associated.

Advantageously, this ensures unawarded house tokens are held within the area of the player responsible for awarding those house tokens. This further minimises cheating during game play as each player can effectively police the house tokens for which they are responsible as these house tokens are within their individual playing area. Also when each player starts out with the same amount of house tokens, the visibility of the unawarded house tokens provides one way for the other players to determine who is winning the current game.

Optionally, a house token holding region of one of the individual playing areas and the reward region of the individual playing area of another different player, are positioned adjacent to one another.

Advantageously, this positioning provides a convenient way for players to award other players game points—house tokens are easily transferred between the two adjacent regions.

Optionally, the gaming tokens includes a plurality of points tokens. The points tokens are distinct from house tokens, and when placed within a given individual playing area, represent cumulative game points awarded to that respective player during previous games.

This provides an advantageous way to track and represent points accumulated in previous games. Typically, after a game has finished the total number of points accumulated by a given player during the course of that game can be determined by enumerating the number of house tokens belonging to other player contained within that given players reward region. Thereafter, points tokens can be awarded for points equal in value to the house tokens earned by players, and the house tokens can be returned to their original position (i.e. back to the player with which they are associated)—so that an new game can be started afresh. A further advantage is that it is easy to track and represent points earned not only during the course of a game and in previous games, but also to distinguish between points earned by player in current and previous games. This improves the feedback provided to players.

Furthermore, the use of two different tokens in this way to track points provides versatile point representation which can reduce the overall number of tokens required on the gaming board. This reduces clutter on the gaming board.

Optionally, each individual playing areas includes a risk region for receiving points tokens. The placement of points tokens on the risk region representing the condition of wagering those points tokens on the outcome of a game.

Optionally, each one of the individual playing areas comprises a vault region for receiving points tokens. The placement of points token on the vault region representing the condition of not wagering those points tokens on the outcome of a game.

Optionally, the individual playing areas are disposed around the periphery of a central common playing area.

Advantageously, this facilitates player interaction within the common playing area, which is in convenient reach of each player's individual playing area.

Optionally, the plurality of gaming tokens comprises a plurality of playing tokens. The placement of at least one of which within the common playing area represents of a change in a game state.

Advantageously, playing tokens placed within the common playing are used to keep track of the state of a particular game. As the common area is used to receive the playing tokens in this way, this leaves the individual playing areas to record points generated as a result of game state change.

Optionally, each playing token is arranged to be placed in one of a first and second position. The first position is the revealed position that reveals the numerical value of the playing token. The second position is the concealed position that conceals the numerical value of the playing token. Preferably, playing tokens that are placed in a revealed position into the common playing area represent a change in a game state, and those which are placed within the common playing area in a concealed position do not represent a change in game state. It will be understood that the playing tokens are distinct from the house tokens and the points tokens.

Optionally, positioning of at least one playing token reveals a particular numerical value into the common playing area representing a point scoring condition. The point scoring condition being recordable by positioning house tokens within a particular reward region.

Optionally, the gaming apparatus may include a scorecard for recording the score represented by the position of house tokens within reward regions at the end of each game.

Advantageously, this allows the score at the end of each game to be recorded as a verification means—this minimises the chance of cheating as the cumulative number of points tokens awarded to players can be double-checked against the scorecard.

Optionally, the gaming apparatus according may include a points token bank for holding unawarded ones of the points tokens at a position separate from the gaming board.

Advantageously, this can minimize cheating, as the unawarded points tokens are kept separate to the players.

Optionally, the plurality of gaming tokens may include at least one bogus stone token, each of the individual playing areas may include a bogus stone token region, and placement of a bogus stone token with the bogus stone token region represents the condition that the player with which that bogus stone token region is associated misses a turn.

Optionally, the common playing area includes a quarry region for accommodating playing tokens. Placement of playing tokens in the quarry region represents that those playing tokens are common to all players and not yet in play.

Optionally, each of the individual playing areas includes a playing token holder region for accommodating playing tokens. Placement of playing tokens in a respective playing token holder region representing that those playing tokens are individual to a respective player.

BRIEF DESCRIPTION OF THE DRAWINGS

Other advantages of the present invention will be readily appreciated, as the same becomes better understood by reference to the following detailed description when considered in connection with the accompanying drawing wherein.

DETAILED DESCRIPTION OF THE INVENTION

Figure 1:
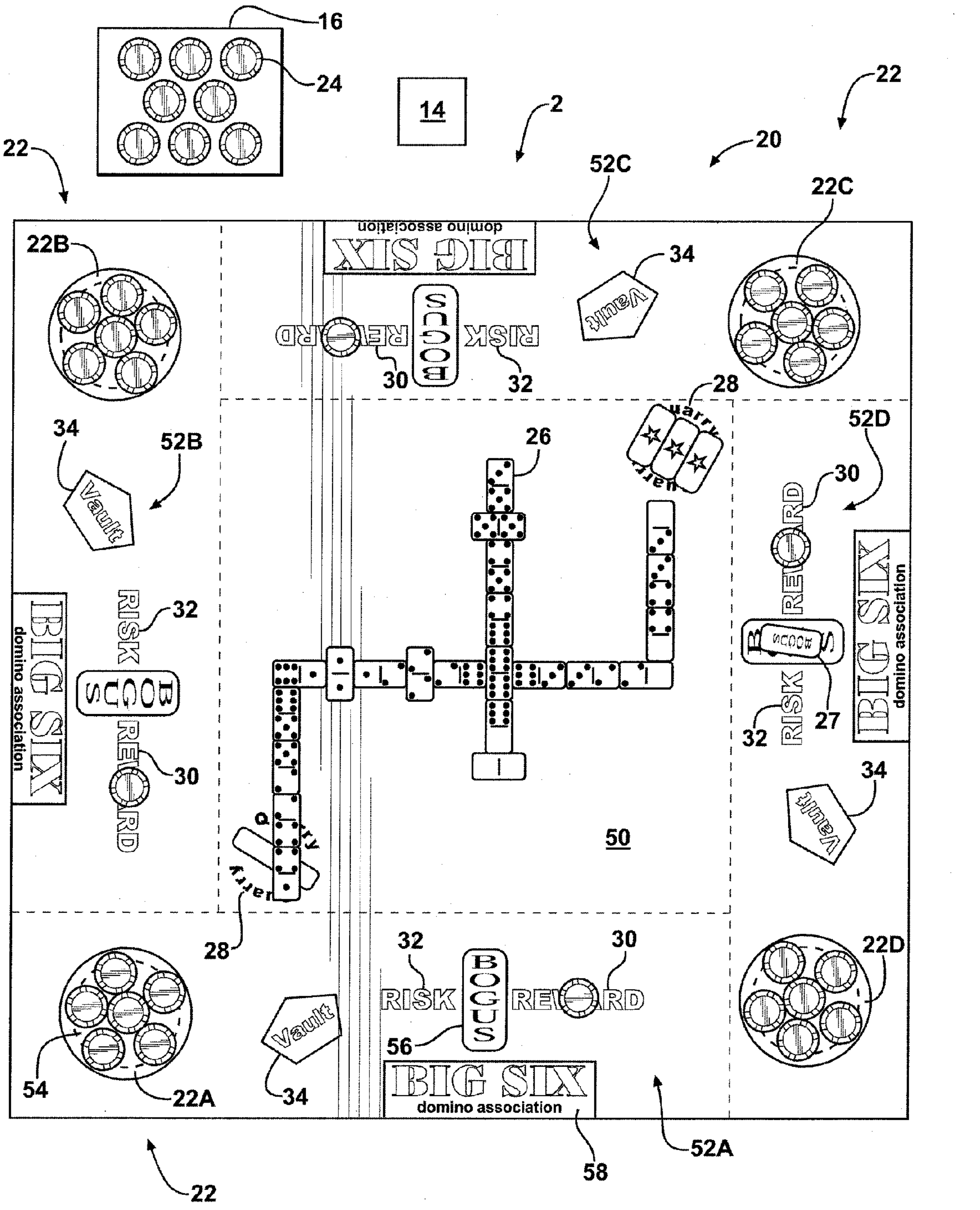
FIG. 1 is a plan view of a game board for a domino game.

Referring to the figures, wherein like numerals indicate corresponding parts throughout the several views, a domino game board is shown generally at 20. The domino game board 20 is utilized for playing a domino match as described herein.

It should be noted that while the following description relates generally to a board or table game implementation of the present invention, the domino game may be implemented in a stand-alone casino game playable by a single player, or a computer network in which multiple players play against each other at remote terminals.

Throughout the specification of this application, the following terms are defined as follows:

banker—the individual identified to convert players' earned house chips 22 into money chips 24, i.e., risk chips;

bogus play—an incorrect or illegal play;

count—command called by any player at the conclusion of a game that requires physically accounting for all the stones 26 at the table;

draw—removing a stone 26 from the pile after they have been washed to begin play, or removing a stone 26 from the quarry;

frozen—the immediate ceasing of play due to a player calling for a count;

game—The playing of stones from the stone holder of all competitors;

gump—playing out of turn;

hero—pulling stones 26 from the quarry when one has a legal play to gain a strategic advantage over one's opponent (s);

house tokens, which may be in the form of chips 22—color-coded chips used for scoring;

line of play (the)—the collection of stones 26 in play during a current game on the table;

locked board—no player can make a play;

match—determined by the first player to win a predetermined number of games;

otis—the drawing of too few stones 26;

pass—a player is unable to make a play;

quarry section 28—stones 26 remaining after all players have drawn their stones 26 at the beginning of a game; each quarry on the board shall hold four stones 26 at the beginning of the game, and players can pull from either quarry as necessary;

reward section 30—house chips 22 received as a result of scoring during a game;

risk section 32—area where money chips 24 may be put into play to increase a player's point total;

score—a legal play resulting in the end dots of the line equaling a number that is a multiple of five;

hand—the playing of stones 26 from the trays of the competitors, multiple games played will lead to a player scoring enough points to win a match;

SET & SLIDE!—the maneuver used to pass and count house chips 22 to a player that has been the first to play all of the stones in that player's tray; it is also the term used to indicate such an occurrence;

smokey—the drawing of too many stones 26;

spinner—a double-stone which can be played on all four sides, it is the first of its kind played in the game;

stake—the amount of vaulted point chips 24 put at risk in a side wager;

stone 26—a game piece designated with a dot value of between one (0) and twelve (12) dots, there is a single game piece that has no dots;

stone 26 holder—holder for a player's stones 26 during tournament play;

tray—the individual stones 26 one has drawn and is responsible for playing;

vault section 34—the designated position on the game board 20 where the point chips 24 are placed;

vaulted point chips 24—house chips 22 that have been converted to money chips 24 and placed into the vault section 34 of the game board 20; and washing—rapid repositioning of the stones 26 to mix them prior to play.

A standard domino set, which is well known in the art, is utilized to play the domino match of the subject invention. The standard domino set includes twenty eight (28) stones 26. Each stone 26 includes a surface divided into equal halves, with each half having a number of exposed dots thereon. The number of exposed dots on each half varies between zero (0) and six (6) dots.

Referring to FIG. 1 there is shown a gaming apparatus 2 according to the present invention comprising a scorecard 14, a points token bank 16, a gaming board 20 and a plurality of gaming tokens. The plurality of gaming tokens comprise a plurality of house tokens 22, a plurality of points tokens 24, a plurality of playing tokens 26 (also known as stones) and a plurality of bogus stone tokens 27 (of which only one is shown in FIG. 1). Tokens may also be known as chips or stones.

The gaming board 20 comprises a central common playing area 50 and four peripheral individual playing areas 52*a*, 52*b*, 52*c*, 52*d*—one for each player. The central common playing area 50 is adjacent to the peripheral individual playing areas 52*a*, 52*b*, 52*c*, 52*d* as is shown by dashed lines in FIG. 1. Each individual playing area is also adjacent with two other individual playing areas as is also shown by dashed lines in FIG. 1.

Within the common playing area 50 is accommodated the plurality of playing tokens 26. The playing tokens 26 are arranged so that they can be placed in one of two positions. One position reveals the numerical value of the playing token (e.g. the centre most playing token—"the spinner" is shown to have the numerical value 6-6). The other position conceals the numerical value of the playing token. All playing tokens 26 shown in the concealed position have the same indicia (e.g. a star) on their visible face so that they cannot be distinguished from one another.

The common playing area 50 comprises a pair of quarry regions 28 on each of which are accommodated playing tokens 26 that have not yet been played. Placement of such playing tokens 26 in the quarry regions represents that those playing tokens 26 may be played by any one of the players.

Each of the individual playing areas comprise a house token holding region 54, a vault region 34, a risk region 32, a bogus stone token region 56, a reward region 30 and a playing token holder region 58.

Each house token holding region 54 accommodates house tokens 22 that have indicia that are attributed to a particular individual playing area. Therefore each set of house tokens 22 are effectively attributed to a particular player. This is illustrated in FIG. 1 by the different markings on the house tokens 22*a*, 22*b*, 22*c* and 22*d*. Therefore, it can be seen that house tokens (e.g. corresponding to reference numeral 22*a*) that are in one individual playing area's house token holding region are different from those in other house token holding regions.

During the course of the game points are awarded by transferring house tokens from one player's house token holding region 54 to another player's reward region 30. One player's house token holding region 54 is adjacent to one other player's reward region 30 so that it is easy for each player to award points to another.

At the conclusion of a game, the number of points that have been accumulated by each player can be enumerated by counting the number of house tokens in their respective reward region. An equivalent number of points tokens 24 can then be awarded to each player by transferring the points tokens 24 from the points token bank 16 which is separate from the gaming board 20.

The house tokens 22 can then be returned to their original positions, for the start of the next game. In addition, the scorecard 16 can be used to record the number of points earned by each player at the end of each game.

Each vault region 34 and risk region 32 are arranged to accommodate points tokens 24. When points tokens 24 are placed onto a risk region 32 this is representative of a player wagering those points tokens 24 on the outcome of a game. When points tokens 24 are placed onto a risk region 32 this is representative of a player not wagering those points tokens 24 on the outcome of a game.

Each bogus stone token region 56 is arranged to accommodate a bogus stone token 27 which when so placed into the bogus stone token region 56 is representative of a player missing a turn.

Each playing token holder region 58 is arranged to accommodate playing tokens 26. Placement of playing tokens 26 into a particular player's playing token holder region 58 represents those playing tokens 26 that can only be played by that particular player. This is in contrast with those playing tokens 26 that are in the quarry region 28 that any player can play.

In the illustrated embodiment, the game board 20 is composed of the following elements: a stone 26 holder/apparatus, a vault section 34, a risk section 32, a reward section 30, a house chip 22 section, a pair of quarry sections 28, and a bogus stone 26 section. The board is arranged for the players to understand the game and the proper placement of each component as described above. The game board 20 of includes symbols that indicate the position where the game official will place the house chips 22, described below, and any earned point chips 24. The house symbol is in every corner of the board in four (4) colors: white, blue, gray and pink. The official places the colored house chips 22 in the similarly colored house chip 22 section of the game board 20 prior to commencement of the match. The vault section 34 is located in four positions on the game board 20, one for each player. Each player places the converted point chips 24, described below, accumulated during the course of play in their respective vault sections 34.

The players accumulate point chips 24 over the course of the game(s) played. Accumulated point chips 24 are converted to permanent point chips 24, i.e., the money chips 24. The vault section 34 is where each player's money chips 24 are positioned on the game board 20. As the point chips 24 and the point value each point chip 24 represents, in a player's vault section 34 grows, the more points that player has to risk in side wagers to attempt to ultimately become the "total point winner" of the match.

To take a risk is to stake earned vaulted point chips 24 into the risk area of the game board 20 in order to place a side wager on a game-by-game basis. The player that SET & SLIDE! in the previous game is always the first to risk their points. Additional players shall, in succession of their playing position, stake the point chips 24 they desire to risk in their designated risk section 32. Players may match, choose to lower the risk, or choose to raise the risked point total. A player may only risk the points they have earned over the course of the game, and all risking of points must be concluded prior to the drawing of the stones 26. If a player does not have any points, i.e. no money chips 24, in the vault section 34, that player may not participate in any side wagers, i.e., that player may not risk points. That player is, however, allowed to continue to play, and may accumulate vaulted points. The winner of the risked points is determined by the player with the most total points scored during the current game after all points have been calculated. The player that SET & SLIDES! may or may not be the point leader for that game. Risk points will be paid after the SET & SLIDE! has occurred.

The reward section 30 of the game board 20 is where a player positions the house chips 22 each player accumulates during a particular hand of a particular domino game during the domino match.

The house section of the board is where a player's house chips 22 for the game are stored. These house chips 22 are only used for the purposes of scoring and are given to one's opponent as they score. House chips 22 are paid to the player to the left of a given position and to the player that SET & SLIDES!.

The house bank section is where the money chips 24 are stored that are used to convert house chips 22 a player earns to money chips 24.

The bogus stone 26 placement section is used to identify a player that has made a mistake during the course of play and alert other players at the table that the player is to lose a turn at their next opportunity. The bogus stone 26 is placed in the bogus stone 26 section on the board.

The official score card is used as a verification tool to assist the players and tournament directors in the tracking of play during the course of a match and/or tournament. All official scores are recorded on the score card. Accordingly, scores for each player are visually displayed on the game board 20 for each domino game of the match.

A match is defined as the number of games required to be played and won by an individual player. This number is determined by all players by setting the total number of games prior to the beginning of play. Preferably, the standard number of game wins required to win a match by an individual player is two (2). However, it should be appreciated that the number of game wins may be chosen to be some other number.

In a tournament format, multiple matches may be required to determine an overall winner. One hand is the equivalent of one game. The first player to play all of their stones 26 during the hand is the winner of the game.

Play in the domino match of the subject invention is always clockwise. The player to make the first play in an individual game varies. However, once the determination of who will make the first play has been made, the player to the immediate left of that player makes the next play.

The washing of the stones 26 at the beginning of the initial game preceding the first game is performed by all participating players seated at the table. To wash the stones 26 means to mix them by rapidly repositioning the stones 26 so that no one player is able to identify the position of a specific stone 26. Subsequent washings after the first SET & SLIDE! will be performed by all players who did not SET & SLIDE!. Within a tournament format, the washing of the stones 26 at the beginning of a match is always done at the direction of the tournament director or by his/her designated representatives. At the start of an individual game, however, the player sitting to the right of the player that SET & SLIDE! is charged with the duty of washing the stones 26. While being washed, the stones 26 must remain face down on the flat playing surface.

Each player draws five (5) stones 26 from the washed pile and places the drawn stones 26 in their stone 26 holders in such a manner that no player can see the respective dots of another player's stones 26. In the absence of stone 26 holders, the stones 26 shall be placed by each player in front of their respective playing position in such a manner as to not disclose the face of the stones 26 to any other players.

After all players have each drawn five (5) stones 26 for their trays, a surplus of eight (8) stones 26 remains. The remaining eight (8) stones 26 are separated into two piles of four (4) each, and placed in the respective quarry sections 28 designated on the game board 20. The stones 26 in the quarry remain face down. This group of remaining stones 26 is called the quarry with four stones 26 per quarry. If a player finds they do not have a matching stone 26 and are unable to play with the stones 26 in their possession, or if the player feels it is to their advantage to draw additional stones 26, the player must then draw individual stones 26 from the quarry section 28 of the game board 20 until that player has a matching stone 26 to put in play. Players may pull from either quarry of their choosing.

At the start of each new game, players are equally able to draw stones 26 at the same time, regardless of who won the previous game.

The player, who draws the "double five" of the domino set, plays it as the lead stone 26 (e.g. Double-5 aka big five) immediately scoring 10 points. If the big five is not drawn, the second highest double (i.e. the double four, double three, double two, double one, double blank, and then the double six, and in that order) is played. If the second highest double was not drawn, the third highest double is played, and so on, until a double is played. If no player holds a double in their tray, all stones 26 are returned to the table, re-washed and new trays are drawn. The player with the highest double starting with the double five makes the first play, and the player sitting to the immediate left of the player having made that play is the next to play. Play continues in a clockwise manner from this point.

The spinner is recognized as the first double-stone (double-five, double-four, etc.) played in an individual game. If at the start of an individual game, the spinner is easily identified because play must begin with a double-stone.

The spinner is the only double-stone in the line of play that can be played from multiple ends. Before players may play from the individual ends of the spinner, however, the spinner must first be "closed". To close the stone 26, this simply means that two individual stones 26 must have been placed perpendicular to the spinner. At this time, players may match additional stone 26 ends corresponding with the number on the spinner with the respective edges of the stone 26. Play from a stone 26 other than the spinner will be considered a bogus play and penalized accordingly.

The double-stone is always played "across" the end of the line or perpendicular to the last stone 26 in the line being played. The stone 26 is to be placed centered to the end stone 26 with the dots equal distance from the center of the previous stone 26 that was the end stone 26. If the double-stone is the first of its kind to come into play in that game, then that stone 26 is considered the spinner.

When a double-stone is placed at the end of a given line, all dots on the stone 26 are counted in the total number of points a player can count. In any other scenario where the double-stone sits within a given line, its ends are not counted despite their position relative to the line.

The line of play is established as players make individual plays during the course of a game. The first player sets his stone 26, the player to their left places their stone 26 to one of the available ends in a clockwise direction around the table. Players are only able to place their stones 26 against stones 26 with matching dots. If a player incorrectly places a stone 26, it is considered a bogus play, i.e., an illegal play.

As each player matches and plays a stone 26, a line is formed. This configuration of stones 26 is called the line of play. Note: to keep the stones 26 centrally located in the center of the table, stones 26 may be played in a manner that allows for a change in the direction of the existing line of play. Players are only able to count the end of the last stone 26 played for scoring purposes. Players are not able to play from the open end stone 26 from which the turn in the line was made.

Stones 26 are joined to the line of play in two ways: 1) with the line of play, lengthwise, the stones 26 played end to end; or 2) across the line of play. Only double-stones are played across the line of play, and these stones 26 must be played across the line of play to avoid a bogus play. If a double-stone is played that is not the spinner, players only have the option of closing the double-stone and continuing the line. If the stone 26 happens to be the spinner, players have more options for play, i.e., the players may play off of other sides of the spinner.

A player is declared the winner of a game by scoring more points than all opponents during that individual game. It is important to note that a player can SET & SLIDE! and not be the highest scorer for the game.

In tournament play, players may enter multiple times with each Player's new entry being considered as a "new Contestant". In tournament play, the player that wins the predetermined number of games required to win the match within a single or double elimination format is declared the winner. Additionally, players have the opportunity to be declared the "total-points winner". Within the format of the domino game of the subject invention, earning total points is critical, along with the various strategies that maximize the number of game wins, as the domino game of the subject invention rewards both achievements.

In the domino match of the subject invention, a player scores by placing matching stones 26 in a manner where the ending dot count of the stones 26 in the line equals a number that is a multiple of five (5). For example, if the first stone 26 to be played is the 6-4, both ends of that stone 26 are ends in that line of play. The total dot count is ten (10) and because that is a multiple of five (5), the player is rewarded with ten (10) points. These points are placed in the reward area.

As another example, assume a player starts the game with the big six stone 26, i.e., the double six stone 26. The total points of the double six stone 26 equals 12 and that player is not able to score. The next player then plays the 6-3 stone 26; the six is placed perpendicular to the big six (matching the six with another six) and now the ends 6, 6, and 3 and the total is fifteen (15). That player is rewarded with fifteen (15) points in house chips 22. Continuing that line, the third player plays the 3-4 against the 6-3 that was played previously. That play makes the ends 6, 6, and 4 for a total of sixteen (16). That player is able to play a stone 26 from their tray but is unable to score any points.

A score is made only when the count of the dots at the ends of the "line of play" are a multiple of five (5). Players will additionally score by being the first to eliminate their stones 26. When this occurs a player has SET & SLIDE!. When a player SET & SLIDES!, the opponents pay the winner of that hand the total number of stone 26 points remaining in their tray. This number is determined by the total number of dots per stone 26. All stones 26 from value 0-7 are given a point total of five (5) points. All stones 26 with a value 8-12 are given a point total of ten (10) points. In the domino game of the subject invention, a value is placed on each stone 26 because of the recognition and awarding of a total points winner, in addition to the game match winner.

To pass a player's tray points to the player that SET & SLIDES!, a player shall respectfully lay one's stones 26 on their backs (dots up) and place the corresponding house chips 22 owed on each stone 26 and then slide them to the winning player of that game. This formality is called the SET & SLIDE! For example, if a SET & SLIDE! has occurred and a player has a single stone 26 left that is the double-four, that player must lay that stone 26 dots up and place ten (10) points worth of house chips 22 on the stone 26 and then SET & SLIDE! this combination to the winning player. Note: a player only passes house chips 22 to reward an opponent that has SET & SLIDE! and not the points in their vault.

The total accumulation of points won during the course of the game along with the points collected after having SET & SLIDE! are added together at the end of the game to come up with a grand point total for each player. If a player does not SET & SLIDE!, they may only count the points accumulated during the course of that game.

At the end of each game, a player transfers his total points accumulated to the vault 34 or won section of the board. Any time a player scores during the course of the next game, those points are placed in the rewards section 30. This enables all players to know what a player has scored during the current game. It additionally prevents a player from adding to their total number of points for the current game which may eschew the results of the risked points described below.

The domino game of the subject invention uses color-coded house chips 22 as a scoring mechanism along with the official score card. Each player is given forty (40) total house chips 22 with a value of two hundred (200) points to start the game. There will be a total of four (4) different colors at each table, one (1) color per player. These chips are referred to as the house chips 22. As a player scores during the game, the players receive house chips 22 from the player to their right, and those house chips 22 are placed on the scoring player's reward section 30 of the game board 20. Points are rewarded to a player collecting the total value of the score that was made on a given play. At no time shall a player have point chips 24 of their own color in either their reward section 30 or their vault section 34.

For the benefit of all players, as house chips 22 are passed between players, the house chips 22 are to be displayed on the board so that each player may see the value of each chip. At no time shall players pass points to one another in a hand-to hand fashion.

A player's position at the table in a game with three or more players is called a seat. Seat assignments at the beginning of a match are determined by the drawing of chip colors for seats 1-4. Seat 1 is always designated as the blue seat; seat 2 is the pink seat; seat 3 is the gray seat; and seat 4 is the white seat. Players will pull individual colored house chips 22 that shall correspond to the respective seat at the table. In a tournament format, this information shall be officially recorded on the score card by a tournament official.

At the end of each game, the player to the right of their opponent must verify the score of that opponent by writing the score of that game and marking their initials in the appropriate area of the scorecard. This verification process assures all players of authentic and verifiable scores.

In tournament play, a player's refusal to sign the scorecard without having a formal complaint or protest shall be just cause for forfeiture of all points, dismissal from the tournament, forfeiture of any proceeds due, and immediate dismissal from the premises.

A player is not allowed to collect points if the player places their stone 26 with a resultant score but does not recognize their score and fails to call it to the table in a timely manner. The player must make the call of their point score prior to the next player placing their stone 26. The spirit of this rule is not intended to have the next player whose turn it is, place their stone 26 before the scoring player has the opportunity to call their score. Opponents will generally be able to tell if a player recognized their points or not. The only penalty to the player is not being able to collect their points after the fact.

Additionally, if a player SET & SLIDES! and in the course of their last play to end the game makes a play that results in a score but the player calls SET & SLIDE! Before calling their points, the player loses the points that could have been collected as a result of the play.

Players must be ever-vigilant of their moves to avoid being called for a bogus play. A play is perfected when a player sets a stone 26 near the line and removes their hand from the stone 26 they are looking to put in play. A play is also perfected if a player makes contact with any stone 26 in the line. In either instance a player is considered locked and committed to that stone 26, whether it is a legal play or not.

To reveal a stone 26 is one of the most egregious errors one can make in the domino game of the subject invention. When a stone 26 is revealed or attempted to be put in play, that stone 26 must remain on the table until it may be played by the offending player and no other stone 26 can be played before that stone 26 is legally put into play.

Players are not allowed to lift any stone 26 in their tray the player does not intend to play during their turn of play. If a stone 26 is lifted during their turn of play, the stone 26 must be put into play. If the stone 26 is not a legal stone 26, meaning the stone 26 cannot be placed against a matching stone 26 on the table, the stone 26 must be set on the table in front of that player "dots-up". This stone 26 must subsequently be played at the first available opportunity and the player is not allowed to make another play until that stone 26 has been put into play. Note: if a player has a stone 26 on the table in front of their tray that they are waiting to put into play and their turn comes without being able to play, that player is not required to pull from the quarry. The player has committed a bogus play, described below. The player loses that turn and potentially will lose subsequent turns; the player is not given the opportunity to place a correct stone 26.

Any player who does not hold a matching stone 26 at their turn of play, must draw from the quarry containing stones 26 that were not drawn at the beginning of the game. Note: there is no penalty for having to pull from the quarry, and a player must pull until able to make a legal play. In the event a player pulls all the stones 26 from the quarry and is still unable to play, that player must then pass the turn to the player to their immediate left. In passing, a player can and should offer a courtesy "knock" on the table and simultaneously announce a pass play. This gesture is also recognized as renouncing one's play. If no player is able to make a play, the game board 20 is considered locked and the game is declared "over".

A player may elect to draw stones 26 from the quarry despite having a stone 26 in their tray that can be played legally. This is a strategic move of that player and will require an incredible amount of skill to successfully make the strategy beneficial. This move is called a hero move. Players are encouraged to know exactly what they are doing before attempting to implement this strategy. An unsuccessful attempt at executing a hero is very likely to result in an opponent winning the game, collecting a multitude of points in the SET & SLIDE!, and possibly winning the game in that single hand.

The game board 20 is considered to be locked when there is no play that can be made by any player. A locked board occurs when the ends of the stones 26 are of the same number and no player has a playable stone 26 in their tray. When it is determined that the board is locked, the game is considered over. Thus, the player that made the last play of a locked board is determined the winner and the respective opponents must reward that player the same way that would be done by a player that SET & SLIDE! in a traditional manner; that player receives the points from each opponent's tray by way of the SET & SLIDE!, and is additionally awarded all points remaining in the quarry.

A player collects the points from their opponent's tray by announcing to the table, "SET & SLIDE!" At the end of a given game when a player SET & SLIDES!, that player's opponents will have stones 26 left in their respective trays. These individual stones 26 have a point value that must be rewarded to the winner of the game. To transfer these points, opponents must execute the SET & SLIDE! maneuver. As called upon from left to right in a clockwise and orderly manner, players must first reveal their stone 26's value by laying the stone 26 dots up in front of their playing position. The player then places either one or two, five (5)-point house chips 22 on the stone 26 depending on the number of dots on the stone 26. Every stone 26 carries a point value regardless of the number of dots on the stone 26. The blankiblank stone 26 has no dots but is still rewarded as five (5) points. This rewards the player for the win and allows for scoring. All stones 26 that have a total dot number of seven (7) or less dots are rewarded with a single five (5)-point house chip 22. Stones 26 with a total dot number of eight (8) through twelve (12) are rewarded two, five (5)-point house chips 22, i.e., ten (10) points.

The final step in executing the SET & SLIDE! is to respectfully slide the individual stones 26 with the house chip(s) 22 on top of each to the winner of that game. The winning player will verify the chip total with the corresponding dot number for accuracy and return the stone(s) 26 to the player, keeping the house chip(s) 22. As described above, players must be careful not to announce SET & SLIDE! prior to announcing a point score at the end of a game. If so, that player forfeits their points on the individual play, but is still awarded the win for the game. The SET & SLIDE! is still performed.

In accordance with the domino game of the subject invention, the players have the unique opportunity to risk money chips 24, i.e., points, in a side wager to gain a point advantage in the match. At the end of the first game of the match, players record their point totals for that game on the official score card. The banker then converts the multi-colored house chips 22 to the equivalent point total in money chips 24, and the house chips 22 are returned to the player sitting in the respective color seat. For example, player 1 won one hundred ten (110) points in game 1; player 2 won sixty (60) points; player 3 won ten (10) points; and player 4 won eighty (80) points. These points, represented by the house chips 22, are converted into money chips 24 and each player places the money chips 24 in their respective vault sections 34 of the game board 20.

The money chips 24 represent the permanent number of points a player will have for the match and tournament. From the moment a player receives their money chips 24, they have the opportunity to grow these points by challenging others on a game-by-game basis. By winning additional points throughout a game, a player is better positioned to be declared the total point winner. Note: no player is required to risk their points.

The risking of points is done prior to the drawing of stones 26, by the individual players, before commencement of the second game of the match. The players risk points by staking their money chips 24 on the risk section 32 of the game board 20. The player to the left risks next. This player can decline to risk their points, match the risk, or raise the risk. This continues around the table. A player may only add point chips 24 to a risk total to match an opponent's risk. The maximum number of points a player can risk is determined by the total number of points in that players vault. Once a player has staked a risk, the money chips 24 cannot be touched at anytime and the risk is considered "locked in". Note: only money chips 24 may be risked in the side wager.

At the end of each game in which a side wager was risked, and after all points have been tabulated, the player having scored the highest point total wins the risk and collects the risk of all players. Note: the player that SET & SLIDE! may not have scored the most points in that game. The winner of the risk goes to the player who holds the highest point total of the game.

A player may only collect a point total from their opponents equal to the risk they staked themselves and no more than what their opponent risked. For example, if a player wins the risk but only risked ten (10) points while the other players risked higher amounts, that player is only entitled to receive ten (10) points from the other players. Likewise, if a player risks one hundred (100) points, but their opponents only risked twenty (20), that player can only collect twenty (20) points from their opponents.

In the event that not every player at the table risks money chips 24, the risk is then between the participating players with the highest point score winning the risk. If there is tie in the total number of points scored amongst players that have risked points on the game, the risk is considered a push and no risked points are transferred. If the player with the highest point total at the end of game did not risk any points, the winner of the risk is determined by the highest point total of those players that did risk.

A bogus play is recognized as a player having made a mistake during the course of play, that if completed could possibly have a negative impact on the other players. This mistake can be executed in a multitude of ways and the resultant penalty is dependent on the infraction. When a bogus play occurs, the player must place the bogus stone 26 in the area as indicated on the board, indicating a loss of turn.

Faking a play to intimidate an opponent is a bogus play, and occurs when a player takes a stone 26 and places it towards the line of play prior to it being that players turn to play. The resultant penalty is a loss of turn.

Playing off an incorrect spinner is a bogus play, and occurs when a player mistakenly identifies a double-stone on the table as the spinner and attempts to make a play against that stone 26. The resultant penalty is a loss of turn. The player must pull the stone 26 and place it dots up in front of their playing position; the stone 26 must be played at the first available opportunity and no other stone 26 can be played until that stone 26 has been put into play. Any points that were scored as a result of the incorrect play are returned to the house. If the infraction goes un-noticed and there is a second play against the incorrect spinner, both the player that initially played against the incorrect spinner and the second player to have played against that stone 26 have committed a bogus play and both lose a turn; the stones 26 are returned to the respective players with the dots up; and the stones 26 returned must be played at the first available opportunity. Again, no other stone 26 may be played until the illegal stones 26 have been put into play. If is it realized that two plays have been made against the incorrect spinner and both plays were made by the same competitor, that player receives two bogus stones 26 and loses two turns. The stones 26 are returned dots up to be played at the first available opportunity. Any points that were scored as a result of the incorrect play are returned to the house. In the event, a play off an incorrect spinner goes undetected and the players are unable to determine who has made what plays against the incorrect spinner, the game is considered "dead" and all points are returned to players' respective house points area. The game is then replayed.

Incorrectly placing a stone 26 is a bogus play, and is identified as a player that places a stone 26 against another whereby the dot numbers do not match. For example, a player inadvertently places the 6-3 stone 26 against the double-6 stone 26. However, in their excitement to score fifteen (15) points, they place the "3" end against the double-6 instead of the correctly placing the "6" end of the 6-3. This was an incorrect play against the correct stone 26. If a player realizes the mistake prior to releasing the stone 26 but makes contact with a stone 26 in the line, the play is considered to be perfected and results in a bogus play. Because the player was attempting to make a correct play, the player must correctly place the stone 26, but is not allowed to collect any points for the play. Note: in the event, that player was attempting to SET & SLIDE! with that play, the player is not allowed to declare SET & SLIDE! and the game play continues to the next player. If the next player then plays their last stone 26, that player achieves SET & SLIDE! status and wins the game. If a player places a stone 26 against another that was not a legal play that stone 26 must be pulled back, placed in front of the player, and played at the first available opportunity. No other stone 26 can be played until that stone 26 has been put into play. For example, a player attempts to place a 2-3 stone against the double-6 stone 26. Such a play is considered to be an attempt to reveal a stone 26 and is illegal.

There are two ways a player can make a bogus play when calling a score: 1) if a player makes a legal play and calls it as a scoring play when it is not, the resultant penalty is that the player's stone 26 is allowed to remain in play, but the player receives a loss of turn at the next play. The player is not allowed to SET & SLIDE! with this play, and the next player is allowed to play. Or 2) if a player makes a legal play and scores but fails to call the correct score, the resultant penalty is the same. If an opponent rewards the player as a result of the bogus score call, the points are returned and the player that attempted to pay the player also receives a bogus for having committed a bailout. Note: if either scenario occurs as a player makes their last play to SET & SLIDE!, the player is not allowed to SET & SLIDE! and loses the turn.

Playing out of turn is called a gump, and is a bogus play. It occurs when a player makes a play when it is not their turn. The resultant penalty is a loss of turn(s). The stone 26 that the player attempted to play must be pulled and placed on the table in front of the player dots up and must be played at the first available opportunity. No other stone 26 can be played until that stone 26 has been put into play.

If a player draws more than five (5) stones 26 into their tray, it is called a smokey, and is a bogus play. Once a smokey has been discovered, the player to the right of the player that committed the smokey must randomly pull the extra stone 26 (s) from the overdrawn tray, without looking at them, and return them to the quarry. The player that commits this infraction is additionally given a bogus stone 26 and loses a turn.

If a player draws less than five (5) stones 26 into their tray, it is called an otis, and is a bogus play. Once an otis has been discovered, the player must pull from the quarry to get the correct number of stones 26 in their tray. The player that commits an otis is additionally given a bogus stone 26 and loses a turn.

Touching risked point chips 24 is a bogus play. A player is not allowed to touch the points they have risked once the risk has been set. If a player is caught touching their risked points, the resultant penalty is a loss of turn and elimination from the risk scenario. Any risked points are still staked and in play for the opponents that also risked points.

If a player has made an initial RISK, that player is then eligible to participate in the LIVE RISKING of points during the GAME. This means a player is able to RISK additional points after each time they make an individual PLAY. A player can also RISK additional points to meet or raise the LIVE RISK of an opponent. To make a LIVE RISK the player places an additional RISK amount in front of their initial RISK amount. From left to right, the opponents must choose to match and/or raise the RISK challenge. Whether the challenge is accepted or not, said player is NOT able to rescind their LIVE RISK. The standard RISK rules apply to determine the rewarding of LIVE RISKED points.

Calling a locked board when the board is not locked is a bogus play. If a player incorrectly determines that the board is locked and calls it to the table, they lose two turns. They lose a turn in making the initial pass instead of drawing from the quarry, and then are given a bogus stone 26 resulting in a loss of play when their turn comes around again.

Getting up from the table of play without permission is a bogus play. Players are allowed to request a brief intermission at the end of a game and a match. They may choose to be excused to exit the table, and may do so once permission has been granted. The player must return within five (5) minutes to avoid penalty. Players are not allowed to exit a table during a game without permission from the opponents at the table. In standard home play, the resultant penalty is a loss of turn. In tournament play, only a tournament official may authorize a player's exit from the table. The excused player must be escorted to player's desired destination by a tournament official. If a player exits the table without the permission of a tournament official, the resultant penalty is immediate disqualification.

Unnecessary handling of the money chips 24 and the house chips 22 is a bogus play. In tournament play, players are encouraged not to have excessive contact with the chips 22, 24 on the table.

In accordance with the domino game of the subject invention, there shall be no slamming and/or excessive slapping of the stones 26 on the table. At no time should a player's playing of a stone 26 be done in a manner that is demonstrative in nature. At no time should a player's placement of the stones 26 be forceful enough to disrupt the line of play. Disruption of the line of play by way of demonstrative slamming constitutes a bogus play. In tournament play, a player will first be given a warning for excessive slamming of the stones 26. If a player continues to disrupt play after having been warned, the player is subject to disqualification and immediate removal from the premises.

If a stone 26 is inadvertently exposed in a standard home game, the player has the opportunity to recover the stone 26 as quickly as possible before a competitor sees the stone 26. If another competitor sees the stone 26, but the other two competitors do not, it is not the responsibility of the opponents to tell the remaining players at the table what stone 26 was exposed.

In tournament play, all stones 26 are to be placed in each player's stone 26 holder. No stone 26 is to be touched until it is ready to be played. If a player accidentally exposes a single stone 26 the player must leave the stone 26 exposed; the player receives a bogus stone 26; and the player is not allowed to make another play before placing that stone 26 in play, no matter how many turns the player loses. In the event a player manages to expose their entire tray, the tray is deemed "dead" and the player is unable to play. This player additionally loses their points for the game.

In tournament play, if any player's stone 26 falls off the table playing surface (whether it hits the floor or not) the player's tray is immediately deemed dead and the player is not permitted to make another play during that game. This player additionally loses their points for the game. A stone 26 that falls from the table surface is not to be touched by any player. The stone 26 is to be retrieved by a tournament official and examined for marks and/or damage. The judge reserves the right to stop the game and replace the stone 26, or restart the game with a new set. All points earned during the current game stand.

In tournament play, at no time is taunting of an opponent allowed. Players should retain and exhibit a professional discourse and sportsmanship at all times. Taunting is grounds for disqualification from the tournament. Obscene and/or foul language may not be used at any time and is cause for forfeiture of a game, games, or match as determined by tournament officials.

At no time is cheating permitted and/or tolerated in play of the domino game of the subject invention. Cheating includes, but is not limited to the offenses listed herein: spectator interaction, communicating the value of one's tray to any opponent, attempting to or looking at an opponent's stones 26 that are not in play, the hiding of stones 26 during play, marking of the stones 26, or the unauthorized passing of any chips 22, 24 at any time to another player for any reason. In tournament play, if a player is exposed for cheating, that player and any accomplices to the act will be disqualified and removed from the premises immediately without compensation or a refund of the entry fee. Additional penalties may include disqualification from competing in future association sanctioned events.

A count occurs when a player feels a reconciliation of stones 26 at the completion of a game is necessary. This count may occur if any player has reason to suspect that there have been less than twenty eight (28) total stones 26 in play at any time during the game. If a stone 26 is missing, the stone 26 play will be reconstructed to determine the disposition of the missing stone 26. If the game cannot be reconstructed and or the missing stone 26 cannot be located, the game will be declared frozen until a tournament official makes a determination as to the status of the game. Actions may include, but are not limited to: counting the game as it stands, playing the game over, disqualification of one or more players from the game, game, match or tournament.

In tournament play, all decisions are final and are the responsibility of the table official designated for that table and/or area. If there are issues that the table official cannot resolve, a tournament official will be summoned to review the issue. After review, the table and tournament officials will make a ruling on the issue. Official rulings are final.

The subject invention discloses a method of playing a domino match. The domino match includes a plurality of individual domino games, with each domino game including being a single hand. The match is played by a plurality of players. The domino match may be played by up to four players, i.e., the number of players is equal to or less than four (4) players.

As described above, the domino match is played with a standard domino set comprising twenty eight (28) stones 26. Each stone 26 includes a surface divided into two equal halves. Each half of the stones 26 includes a number of dots inscribed thereon. The number of dots inscribed on each half of the stones 26 is within the range of zero (0) and six (6) dots.

The method further comprises the step of issuing the house chips 22, described above, to each of the plurality of players. The house chips 22 include chips 22 comprising four different colors with only one of the colors of house chips 22 issued to each of the up to four different players. Accordingly, each player is issued house chips 22 of a single color. The point value of house chips 22 issued to each of the plurality of players is equal to two hundred (200) points.

The method further comprises the step of washing the stones 26 prior to beginning each game. The step of washing the stones 26 involves placing the stones 26 on a surface such that the dots are not visible, and mixing the stones 26 so as to prevent any player from knowing the number of dots on any stone 26.

The method further comprises the step of each player drawing five stones 26 from the washed stones 26 to begin each game. As described above, all players may draw their stones 26 simultaneously at the beginning of the first game.

The method further comprises the step of starting play of the first game of each of the plurality of games with the player having the highest double stone "starting with the double five" 26 drawn from the washed stones 26 placing that stone 26 on the domino board to start play. The method further comprises the step of playing a first domino game in accordance to the rules described above. As described above, the domino match likely consists of several games.

The method further comprises the step of awarding a point value to the players based on an individual play during each game satisfying a pre-determined result. The step of awarding a point value to the players based on an individual play during each game of the domino match satisfying a pre-determined result is further defined as awarding house chips 22 representing a point value to the players based on an individual play during each game of the domino match satisfying a pre-determined result. More specifically, the step of awarding a point value to the players based on an individual play during each game of the domino match satisfying a pre-determined result is further defined as awarding a points to one of the plurality of players in response to the one player placing a stone 26 in a domino line resulting in a sum of the ends of the domino line being an integer multiple of the number five (5). The number of points awarded in response to the one player placing a stone 26 in a domino line resulting in a sum of the ends of the domino line being an integer multiple of the number five (5) is equal to one (1) point awarded for every dot exposed on the ends of the domino line. Additionally, the step of awarding house chips 22 representing a point value based on individual plays is further defined as awarding house chips 22 from the player to the right of the player awarded the house chips 22 in a counter clockwise direction.

The method further comprises the step of notifying all other players of a play qualifying for an awarded point value prior to any other of the players making a play. As described above, when an individual play is made qualifying for an award, i.e., when a play is made such that the ends of the domino line of play is an integer multiple of the number five (5), then the player to be awarded the points must call out to the other players, notifying the other players of such a play and the amount of the awarded points.

The method further comprises the step of determining a winner of the at least one hand. The step of determining a winner of the at least one game is further defined as declaring the player having scored more points than all opponents during the course of a given game and after all points have been tallied as a result of one player achieving SET & SLIDE! status.

The method further comprises the step of awarding a point value to the winner of each of the at least one game of the domino match. The step of awarding a point value to the winner of each of the at least one game of the domino match is further defined as awarding house chips 22 representing a point value to the winner of each of the at least one game of the domino match. The step of awarding a point value to the winner of each of the at least one game of the domino match is further defined as awarding points to the winner of the at least one game based on the number of dots on each stone 26 held by all players other than the winner at the end of each game. The number of points awarded to the winner of the at least one game based on the number of dots on each stone 26 held by all players other than the winner at the end of each game is equal to five (5) points for each stone 26 having between zero (0) dots and seven (7) dots and ten (10) points for each stone 26 having between eight (8) dots and twelve (12) dots.

The method further comprises the step of converting the house chips 22 awarded to each player during the domino game to point chips 24 representing a total awarded point value. As described above, the banker converts the house chips 22 each player earned during the course of the domino game to money chips 24. The house chips 22 are then returned to the appropriate player that originally issued the house chips 22.

The method further comprises the step of at least one player wagering at least a portion of the points awarded during the first domino game against at least a portion of the points awarded during the first domino game by at least one other player in a side wager on the outcome of at least one game in at least one subsequent domino game. The step of wagering at least a portion of the points awarded during the first domino game against at least a portion of the points awarded during the first domino game by at least one other player in a side wager is further defined as wagering at least a portion of the house chips 22 representing a point value awarded during the first domino game against at least a portion of the house chips 22 representing a point value awarded during the first domino game by at least one other player in a side wager.

The method further comprises the step of playing the at least one subsequent domino game, and the step of declaring a winner of each of the side wagers based upon the player awarded the highest point value during each game.

The method further comprises the step of declaring the first player to win greater than a predetermined number of games a game winner of the match. Additionally, the method further comprises the step of declaring the player awarded the greatest point value during each of the plurality of domino games and won from any of the side wagers placed on each of the at least one game of the at least one subsequent series of domino games a total point winner of the match.

As described above, the domino set includes a score card, and the method further comprises the step of recording the point values awarded during the match on the score card. The method further comprises the step of verifying the recorded point values on the score card. Verification of each player's recorded score is performed by one of the other players of the game as described above.

As described above, the domino set includes the game board 20 having the, the bogus section, the vault section 34 and the risk section 32. The method further comprises the step of positioning any awarded house chips 22 on the vault section 34 of the board during the course of the game. The method further comprises the step of positioning the point chips 24 in converted from the house chips 22 by the banker in the vault section 34 of the board game. The method further comprises the step of placing a stone 26 in the bogus section of the game board 20 in response to an attempted bogus play. The bogus play may include any of the bogus plays described above. The method further comprises moving the point chips 24 wagered on the side wagers from the vault section 34 to the risk section 32 of the domino board in order to place a side wager.

Rules of a Specific Embodiment

With reference to FIG. 1, and in play, the rules and exemplary game play of a specific embodiment of the present invention, embodied in the game known as BIGSTAKES5 will now be described.

1. Game Objective:

The overall objective of the BIGSTAKES5 game is to defeat one's opponent(s) with skill and strategy by being the first to PLAY all of the stones from one's TRAY thus enabling a player to outscore their opponent(s) through the accumulation of points during a respective GAME. It is important to note that in the BIGSTAKES5 game, a GAME is defined as what would traditionally be known as a "hand". This means that after each "SET & SLIDE!" a player has won that game.

In the BIGSTAKES5 game, the player that is able to accumulate the most points at the end of a game is declared the winner. Within the BIGSTAKES5 game format, total points are critical along with the various strategies that maximize BOTH game-wins and points, as the BIGSTAKES5 game rewards both achievements. Players are highly encouraged to employ multiple strategies involved in positioning themselves for the overall title. See RISK/REWARD.

2. Game Summary:

In the BIGSTAKES5 game, a PLAY is perfected by a player mentally and visually matching corresponding stones in their respective TRAY and then placing a complementary-numbered stone end-to-end in a manner that optimally will result in a total dot count in multiples of FIVE, e.g. 5, 10, 15, 20, etc. A player may not always be fortunate to have their stone ends equal a number that is a multiple of 5; however, a player may still PLAY a stone that matches another stone allowing for a completed PLAY. While making PLAYS, a player should be mindful and respectful of the pace of play and attempt to make a PLAY in a manner consistent with the overall flow and spirit of the MATCH. In a standard BIGSTAKES5 match, the first player that amasses the most points over a 5-game set is declared the winner of the MATCH.

3. How to Win the Game and the Match:

A player is declared the winner of a GAME by scoring more points than all other opponents, irrespective of which player is the first to SET & SLIDE! (eliminate all of the stones from one's TRAY prior to one's opponents and then subsequently receiving the equivalent points remaining in their opponents TRAY). It is important to note that a player can attain SET & SLIDE! status and not be the highest scorer for the GAME. See Scoring.

In some tournament formats, the first player to attain SET & SLIDE! status, irrespective of the number of points that player scored over the course of the GAME, is declared the winner of said GAME. Players are rewarded with an additional 50 BONUS points for each GAME-win in the 5-GAME SET. After ALL GAME points are tabulated, the player with the highest total is declared the winner.

In BIGSTAKES5 tournament play, the player(s) that accumulate the highest point total by way of GAME-WINS and POINTS over the course of the tournament is declared the winner.

4. What Constitutes a Match?

A MATCH is defined as the 5-GAME SET. Players have the option of playing as many MATCHES as they desire prior to the beginning of play. The standard number of GAMES in a MATCH is 5. The number of points distributed prior to the start of play is completely optional in home play. If no MONEY CHIPS are distributed prior to the start of play, the MONEY CHIPS are distributed at the end of the first GAME. In a tournament format, MONEY CHIPS will be distributed prior to the start of play and the total number of GAME SETS played may vary based on the total number of participants.

5. How to Score in the BIGSTAKES5 Game:

In the BIGSTAKES5 game, a player scores by placing matching stones in a manner where the ending dot count of the stones in the line equals a number that is a multiple of five (5). For example, if the first stone to be PLAYED is the 6-4, both ends of that stone are ends in that LINE OF PLAY. The total dot count is 10 and because that is a multiple of five, the player is REWARDED with 10 points. These points are placed in the REWARD area. See REWARD.

As another example, let's observe a player starting the game with the Big Six stone. The total points of that stone equal 12 and that player is not able to SCORE. The next player then PLAYS the 6-3 stone; the six is placed perpendicular to the Big Six (matching the six with another six) and now the ends 6, 6, and 3 (See Playing the Double-stone) and the total is 15. That player is rewarded with 15 points in HOUSE CHIPS; each HOUSE CHIP has a value of 5 points. Continuing that line, the third player PLAYS the 3-4 against the 6-3 that was PLAYED previously. That PLAY makes the ends 6, 6, and 4 for a total of 16. That player is able to PLAY a stone from their TRAY but is unable to score any points.

A score is made only when the count of the dots at the ends of the "line of play" are a multiple of 5.

Players will additionally SCORE in the BIGSTAKES5 game by being the first to eliminate their stones. When this occurs a player has attained SET & SLIDE! status. When a player calls SET & SLIDE!, the opponents pay the winner of that GAME the total number of stone points remaining in their TRAY. This number is determined by the total number of dots per stone. All stones from value 0-7 are given a point total of 5 points. All stones with a value 8-12 are given a point total of 10 points. In the BIGSTAKES5 game, a value is placed on each stone.

To pass one's points to the player that calls SET & SLIDE!, a player shall respectfully lay one's stones on their backs (dots up) and place the corresponding HOUSE CHIPS owed on each stone and then slide them to the winning player of that GAME. This formality is called the SET & SLIDE! (See SET & SLIDE!). For example, if an opponent has called SET & SLIDE! and a player has a single stone left that is the double-five, that player must lay that stone dots up and "SET" 10 points worth of HOUSE CHIPS on the stone and then "SLIDE" the chips to the winning player. NOTE: A player only passes HOUSE CHIPS to reward an opponent that has called SET & SLIDE! and not the points in their REWARD or VAULT position.

The winning player counts the total number of points won during a GAME along with the additional points collected from that player's opponents to come up with a grand total. The players that do not attain SET & SLIDE! status may only count the points in their REWARD section for that GAME.

At the end of each GAME, a player transfers the total points accumulated to their VAULT section of the board. Any time a player scores during the course of a GAME, those points are placed in the REWARD section. This enables all players to know what a player has scored during the current GAME. It additionally prevents a player from adding to their total number of points for the current GAME which may eschew the results of the RISKED points.

6. Recording the Score:

The BIGSTAKES5 game uses color-coded chips valued as 5-points each as its scoring mechanism along with an official scorecard. Each player is given 40 total chips with a HOUSE value of 200 points to start the MATCH. There will be a total of four (4) different colors at each table, one (1) color per player. The chips are called the HOUSE CHIPS.

As a player scores during the GAME, their chips are rewarded from the player to their right and placed on the scoring player's REWARD section of the game board. Points are rewarded to a player collecting the total value of the score that was made on a given PLAY. At NO time shall a player have point chips of their own color in either their REWARD total or their VAULT total.

For the benefit of all players, as points are passed between opponents, the chips are to be displayed on the board so that each player may see the value of each chip. At NO time shall players pass points to one another in a hand-to-hand fashion.

At the end of each GAME, each player must verify their score by writing the score of that GAME and marking their initials in the appropriate area of the SCORECARD. SEE OFFICIAL SCORECARD. This verification process assures all players of authentic and verifiable scores. In BIGSTAKES5 tournament play, a player's refusal to sign the scorecard without having a formal complaint or protest shall be just cause for forfeiture of all points, dismissal from the tournament, forfeiture of any proceeds due, and immediate dismissal from the premises. Additional penalties may be imposed by the BIGSIX DOMINO Association.

7. Missing a Score:

A player is not allowed to collect points if the player places their stone with a resultant score but does not recognize their score and fails to call it to the table in a timely manner. The player must make the call of their point score prior to the next player placing their stone. The spirit of this rule is not intended to have the next player whose turn it is, place their stone before the scoring player has the opportunity to call their score. Opponents will generally be able to tell if a player recognizes their points or not. The ONLY penalty to the player is NOT being able to collect their points after the fact.

Additionally, if a player attains SET & SLIDE! status and in the course of their last play to end the GAME makes a PLAY that results in a score but the player calls SET & SLIDE! before calling their points, the player loses the points that could have been collected as a result of the PLAY.

If an opponent calls points for another or in any way attempts to signal an opponent that points are on the table that have not been called, that player has committed a BIRDIE. This is a BOGUS PLAY and that player loses a turn; the player that failed to call their points is not awarded the points. SEE BOGUS PLAY.

8. What Constitutes an Official Play?

While the tournament rules for the BIGSTAKES5 game are considerably more stringent than the home rules, players must be ever-vigilant of their moves to avoid being called for a BOGUS PLAY. In the home rules of the BIGSTAKES5 game, a PLAY is perfected when a player sets a stone near the line and removes their hand from the stone they are looking to put in play. A PLAY is also perfected if a player makes contact with any stone in the line. In either instance a player is considered locked and committed to that stone, whether it is a legal PLAY or not. To reveal a stone is one of the most egregious errors one can make in the BIGSTAKES5 game. When a stone is revealed or attempted to be put in play, that stone must remain on the table until it can be PLAYED and no other stone can be PLAYED before that stone is legally put into play. See BOGUS PLAY.

In BIGSTAKES5 tournament play, players are NOT allowed to remove any stone in their STONE HOLDER they DO NOT intend to PLAY while it is that player's turn. Otherwise, a player is allowed to arrange their stones while awaiting their turn. If it is that player's turn, however, and a stone is removed from the player's STONE HOLDER, the stone must be put into play. If the stone is not a legal stone, meaning the stone cannot be placed against a matching stone on the table, the stone must be set on the table in front of that player "dots-up". This stone must subsequently be PLAYED at the first available opportunity, and the player is not allowed to make another PLAY until that stone has been put into play. The player has committed a BOGUS PLAY. The player, in effect, immediately loses two turns because they are not able to make that PLAY and the next time their turn comes around, they are skipped. After the two turns have passed, the player must still only PLAY the stone on the table that caused the BOGUS PLAY initially. NOTE: If a player has a stone on the table in front of their STONE HOLDER that they are waiting to put into play and their turn comes without being able to PLAY, that player is not required to pull from the QUARRY. In the event a player attempts to make a play from their TRAY while they have a BOGUS, the player receives a second BOGUS stone and the second stone cannot be put into play until after the first BOGUS stone has been put into play. If the sequence of BOGUS PLAYS results in a LOCKED BOARD, the last player to PLAY wins achieves SET & SLIDE! status and based on points accumulated, may win that GAME.

9. Direction of Play:

Play in the BIGSTAKES5 game is always clockwise. The player to make the first PLAY in an individual GAME will always vary. However, once the determination of who will make the first PLAY has been made, the player to the immediate left of that player makes the next PLAY.

10. Line of Play:

In the BIGSTAKES5 game, the LINE OF PLAY is established as players make individual PLAYS during the course of a GAME. The first player sets his stone, the player to the left places their stone to one of the available ends in a clockwise direction around the table. Players are only able to place their stones against stones with matching dots. If a player incorrectly places a stone, it is considered a BOGUS PLAY, an illegal play. See BOGUS PLAY.

As each player matches and PLAYS a stone, a line is formed. This configuration of stones is called the LINE OF PLAY. NOTE: To keep the stones centrally located in the center of the table, stones may be PLAYED in a manner that allows for a change in the direction of the existing LINE OF PLAY. Players are only able to count the end of the last stone PLAYED for scoring purposes. Players are not able to PLAY from the open end stone from which the turn in the line was made.

Stones are joined to the LINE OF PLAY in two ways: 1) lengthwise with the LINE OF PLAY, the stones PLAYED end to end; or 2) across the LINE OF PLAY. In the BIGSTAKES5 game, only double-stones are PLAYED across the LINE OF PLAY; these stones must be PLAYED across the LINE OF PLAY to avoid a BOGUS PLAY. If a double-stone is PLAYED that is not the spinner, players only have the option of closing the double-stone and continuing the line. Simply stated, any double-stone that is PLAYED must be PLAYED perpendicular to the end of the line and never lengthwise in an end-to-end manner. If the stone happens to be the SPINNER, players have more options for play. See PLAYING OFF THE SPINNER.

11. Seating Assignments:

A player's position at the table is called a seat. Seat assignments at the beginning of a MATCH are determined by the DRAWING of chip colors. Seat 1 is designated as the blue seat; seat 2 is the pink seat; seat 3 is the gray seat; and seat 4 is the white seat. Players will pull individual colored chips that correspond to the respective seat at the table. In a tournament format, this information shall be officially recorded on the BIGSIX DOMINO Association's BIGSTAKES5 SCORECARD by a BIGSIX DOMINO Association Official (See FIG. 2).

12. WASHING the Stones:

The WASHING of the stones at the beginning of the GAME shall be performed by all participating players seated at the table. To WASH the stones means to mix them by rapidly repositioning the stones so that no one player is able to identify the position of a specific stone. Subsequent WASHINGS after the first SET & SLIDE! will be performed by all players who DID NOT attain SET & SLIDE! status. Within a tournament format, the WASHING of the stones at the beginning of a MATCH is always done at the direction of the tournament Director by his/her designated representatives. Before a GAME in a standard "home game" of the BIGSTAKES5 game, any player at the table may WASH the stones. While being WASHED, the stones must remain face down on the flat playing surface.

13. Drawing for the Game:

Each player will DRAW five (5) stones from the WASHED pile and place the stones in their STONE HOLDERS in such a manner that no player can see the respective dots of another player's stones.

After all players have each DRAWN five (5) stones for the GAME, there will be eight (8) stones left. They will be separated into to piles of four (4) each, then moved to the respective QUARRY positions as designated on the playing surface. These stones are to remain face down. If a player finds they do not have a matching stone and are unable to PLAY with the stones in their possession, or if the player feels it is to their advantage to DRAW additional stones, the player must or may DRAW individual stones from the QUARRY until said player has a matching stone to put in play or has found the stone they sought to gain the strategic advantage. Players may pull from either QUARRY of their choosing.

At the start of each new GAME, players are equally able to DRAW stones at the same time, regardless of who won the previous GAME.

14. Beginning the Game:

To begin any new GAME in BIGSTAKES5, each player DRAWS a TRAY of five (5) stones from the WASHED pile. The player who DRAWS the Big Five (aka the "double-five" of the set) PLAYS it as the lead stone. If the Big Five is not DRAWN, the second highest double (the double-four) is PLAYED. If the second highest double was not DRAWN, the third highest double (the double-three) is PLAYED, and so on down and through the double-blank and then to the double-six, until a double is PLAYED. If no player holds a double stone in their TRAY, all stones are returned to the table, RE-WASHED and new TRAYS are DRAWN. The player with the highest double stone makes the first PLAY, and the player sitting to the immediate left of the player having made the first PLAY is the next to PLAY. Play continues in a clockwise manner from this point. In making said PLAY, if the total value of the stone PLAYED equals a multiple of five, the player is allowed to collect their points if the value is correctly called. The player that PLAYS the Big Five should remember to always be sure to collect their 10 points; often times, players do not realize they can score on the very first play of the game.

In the event a player pulls both the Big Five along with another double stone, the player DOES NOT have the option of choosing to PLAY the other double stone. If a player is caught making such an infraction, the player forfeits all points for the GAME and any points RISKED. In tournament play, the player making this infraction is subject to immediate disqualification with forfeiture of the tournament entry fee, standing in the tournament rankings, loss of any proceeds due the player, and possible sanctioning from the BigSix Domino Association.

15. The Spinner:

The SPINNER is the first double-stone (double-six, double-five, etc.) played in an individual GAME. The SPINNER is easily identified because play must begin with a double-stone.

16. Playing off the Spinner:

The SPINNER is the only double-stone in the LINE OF PLAY that can be played from multiple ends. Before players may PLAY from the individual ends of the SPINNER, however, the SPINNER must first be "closed". To close the stone, this simply means that two individual stones must have been placed perpendicular to the SPINNER. At this time, players may match additional stone ends corresponding with the number on the SPINNER with the respective edges of the stone. PLAY from a stone other than the SPINNER will be considered a BOGUS PLAY and penalized accordingly. See BOGUS PLAY.

17. Playing the Double-Stone:

The double-stone in the BIGSTAKES5 game is always PLAYED "across" the end of the line or perpendicular to the last stone in the line being PLAYED. The stone is to be placed centered to the end stone with the dots equal distance from the center of the previous stone that was the end stone. When a double-stone is placed at the end of a given line, all dots on the stone are counted in the total number of points a player can count. In any other scenario where the double-stone sits within a given line, its ends are not counted despite their position relative to the line.

18. Unable to Play:

Any player who does not hold a matching stone at their turn of PLAY must DRAW from the QUARRY containing stones that were not DRAWN at beginning of the GAME. NOTE: There is no penalty for having to pull from the QUARRY, and a player must pull until able to make a legal PLAY. In the event a player pulls all the stones from the QUARRY and is still unable to PLAY, that player must then PASS the turn to the player to their immediate left. In PASSING, a player can and should offer a courtesy "knock" on the table and simultaneously announce a PASS PLAY. If NO PLAYER is able to make a PLAY, the game board is considered LOCKED and the GAME is "Over". See LOCKED BOARD.

19. Pulling Stones for Strategic Purposes—A "HERO":

In the BIGSTAKES5 game, a player may elect to DRAW stones from the QUARRY despite having a stone in their TRAY that can be PLAYED legally. This is a strategic move for that player and will require an incredible amount of skill to successfully make the strategy beneficial. This move is specific to the BIGSTAKES5 game and is called a HERO. Players are encouraged to know precisely their strategy in attempting to execute this move before attempting to implement this strategy. A player's unsuccessful attempt at executing a HERO is very likely to result in an opponent winning the GAME, collecting a multitude of points in the SET & SLIDE!

20. Locked Board:

A board is considered to be LOCKED when there is no PLAY that can be made by any player. A LOCKED BOARD occurs when the ends of stones are of the same number and no player has a playable stone in their TRAY. NOTE: There are seven (7) stones per number in a total set of stones. If all of the ones (1's) for example, have been played and the end of every line has a one (1), this means no other stones can be played. The board is locked.

21. Resolution of the Locked Board:

In BIGSTAKES5 play, when it is determined the board is LOCKED, the GAME is "Over". Thus, the player that made the last PLAY of a LOCKED BOARD gains the advantage in the determination of the winner of that GAME, as the respective opponents must reward that player the same way that would be done by a player that SET & SLIDE! in a traditional manner. That player receives the points from each opponent's TRAY by way of the SET & SLIDE! and is additionally awarded all points remaining in the QUARRY.

22. SET & SLIDE!:

In the BIGSTAKES5 game, a player collects the points from their opponent's TRAY by announcing to the table, "SET & SLIDE!" This means they are the first to have eliminated all of their stones. At the end of a given GAME when a player attains SET & SLIDE! status, that player's opponents will have a stone and/or stones left in their respective TRAY. These individual stones have a point value that must be rewarded to the winner of the GAME. To transfer these points, opponents must execute the SET & SLIDE! maneuver.

As called upon from left to right in a clockwise and orderly manner, players must first reveal their stone's value by laying the stone dots up in front of their playing position. The player then places either one or two 5-point HOUSE CHIPS on the stone depending on the number of dots on the stone. Every stone carries a point value regardless of the number on the stone. The blank/blank stone has no dots but is still rewarded as 5 points. This rewards the player for the win and allows for scoring. All stones that have a total dot number of 7 or less are rewarded with a single 5-point chip. Chips with a total dot number of 8-12 are rewarded two 5-point chips.

The final step in executing the SET & SLIDE! is to respectfully slide the individual stones with the point chip(s) on top of each to the winner of that GAME. The winning player will verify the chip total with the corresponding dot number for accuracy and return the stone(s) to the pile of stones, keeping the HOUSE CHIP(s) points earned.

Players must be careful not to announce SET & SLIDE! prior to announcing a point score at the end of a GAME. If so, that player forfeits their points on the individual PLAY, but is still awarded the win for the GAME, and the SET & SLIDE! is still performed.

23. Risking Points:

In the BIGSTAKES5 game, players have the unique opportunity to RISK points to gain a point advantage in the MATCH.

A standard 5-GAME SET is begun with a given number of MONEY CHIPS (valued in denominations of 5, 25, 100, 500, 1000, 5000, 10000, and 100,000). Players have the option to earn their points however, and at the end of the first GAME of the MATCH, players record their point totals for that GAME on the Official BIGSTAKES5 SCORECARD. The BANKER then converts the multi-colored HOUSE CHIPS to the equivalent point total in MONEY CHIPS, and the HOUSE CHIPS are returned to the player sitting in the respective color seat. For example, player 1 won 60 points in Game 1; player 2 won 40 points; player 3 won 30 points; and player 4 won 25 points. These points are converted to MONEY CHIPS and each player places the chips in their respective VAULTS. The MONEY CHIPS represent the permanent number of points a player will have for the MATCH and tournament. From the moment a player receives their MONEY CHIPS, they have the opportunity to grow these points by challenging others on a GAME-by-GAME basis. By winning additional points throughout a GAME, a player is better positioned to be declared the TOTAL POINTS winner.

NOTE: No player is required to RISK their points in home play.

The initial RISKING of points is done prior to the DRAWING of stones by individual players. The player who called SET & SLIDE! in the previous GAME, sets the STAKES for the RISKING of points for the current GAME. If this player chooses not to RISK any points, the player to the left STAKES the RISK threshold for the GAME. The player RISKS points by STAKING their MONEY CHIPS on the RISK section of the game board. The player to the left RISKS next. This player can decline to RISK their points, match the RISK, or raise the RISK. This continues around the table. A player may only add chips to a RISK total to match an opponent's RISK. If a player chooses to RISK points, the minimum point RISK is 10 points; the maximum number of points a player can RISK is determined by the total number of points in that players VAULT. Once a player has STAKED a RISK, the chips cannot be touched at anytime and the RISK is considered "locked in". Tournament rules may vary with respect to the minimum RISK level. NOTE: ONLY MONEY CHIPS CAN BE PUT AT RISK.

Once the GAME begins, players place their points scored during that GAME on the "REWARD" section of the game board. This allows players to know what points have been earned during that current GAME.

At the end of that GAME and after ALL points have been tabulated, the player having scored the highest point total wins the RISK and collects the RISK of all players. NOTE: The player that calls SET & SLIDE! may not have scored the most points in that GAME. The winner of the RISK goes to the player who holds the highest point total of the GAME. A player may only collect a point total from their opponents equal to the RISK they STAKED themselves and no more than what their opponent RISKED. For example, if a player wins the RISK but only RISKED 10 points while the other players RISKED higher amounts, that player is only entitled to receive 10 points from the other players. Likewise, if a player RISKS 100 points, but their opponents only RISKED 20, that player can only collect 20 points from that player's opponents.

In the event that not every player at the table RISKS points, the RISK is then between the participating players; the highest point score of these players wins the RISK. If there is tie in the total number of points scored amongst players that have RISKED points on the GAME, the RISK is considered a push and no RISKED points are transferred.

23a. The Live Risk:

If a player has made an initial RISK, that player is then eligible to participate in the LIVE RISKING of points during the GAME. This means a player is able to RISK additional points after each time they make an individual PLAY. A player can also RISK additional points to meet or raise the LIVE RISK of an opponent. To make a LIVE RISK the player places an additional RISK amount in front of their initial RISK amount. From left to right, the opponents must choose to match and/or raise the RISK challenge. Whether the challenge is accepted or not, said player is NOT able to rescind their LIVE RISK. The standard RISK rules apply to determine the rewarding of LIVE RISKED points.

24. BOGUS PLAY:

In the BIGSTAKES5 game, a BOGUS PLAY is recognized as a player having made a mistake during the course of play that, if completed, could possibly have a negative impact on the other players. This mistake can be executed in a multitude of ways and the resultant penalty is dependent on the infraction. When a BOGUS PLAY occurs, the player must place the BOGUS stone in the area as indicated on the Board, indicating a loss of turn.

The following will constitute a BOGUS PLAY:

24a. Faking a Play to Intimidate an Opponent

Faking a play to intimidate an opponent occurs when a player takes a stone and places it towards the LINE OF PLAY prior to it being that players turn to play. The resultant penalty is a loss of turn.

24b. Playing off an Incorrect SPINNER—The DEAD END

Playing off an Incorrect SPINNER occurs when a player mistakenly identifies a double-stone on the table as the SPINNER and attempts to make a PLAY against that stone. This player has made a DEAD END play and the resultant penalty of this BOGUS PLAY is a loss of turn. The player must pull the stone and place it dots up in front of their playing position. The player loses that turn and their subsequent PLAY; and from that point, the stone must be PLAYED at the first available opportunity. No other stone can be played until that stone has been put into play. Any points that were scored as a result of the incorrect PLAY are returned to the HOUSE.

In the event, multiple PLAYS have been made against an incorrect SPINNER before the table realizes what has occurred, at the point the error is realized, the last player to PLAY against the line receives a BOGUS with the subsequent penalties and the line off that stone is declared a DEAD END and the stones in that line are turned over to prevent further play and scoring from that line. From this point, players must PLAY and SCORE from the correct SPINNER.

24c. Incorrectly Placing a Stone

Incorrectly placing a stone is identified as a player that places a stone against another whereby the dot numbers do not match, because the stone was placed in an inverted position to the way it should have been placed. For example, a player inadvertently places the 6-3 stone against the double-6 stone. However, in their excitement to score 15 points, they place the "3" end against the double-6 instead of the correctly placing the "6" end of the 6-3. This was an incorrect PLAY against the correct stone. Because the PLAY was perfected, it results in a BOGUS PLAY and the loss of a single turn; and since the player was attempting to make a correct PLAY, the player must correctly place the stone, but is not allowed to collect ANY points for the PLAY. NOTE: In the event, that player was attempting to SET & SLIDE! with that PLAY, the player is not allowed to declare SET & SLIDE! and the game play continues to the next player. If the next player then plays their last stone, that player attains SET & SLIDE! status and wins the GAME.

If a player places a stone against another that was not a legal PLAY that stone must be pulled back, placed in front of the player, and PLAYED at the first available opportunity after that player has missed two (2) turns. No other stone can be PLAYED until that stone has been put into play. For example, a player attempts to place a 2-3 stone against the double-6 stone. Such a PLAY is considered to be an attempt to reveal a stone and is illegal.

24d. Calling an Incorrect Point Score and Incorrect Payment of said Points

There are two ways a player can make a BOGUS PLAY when calling a score: 1) If a player makes a legal PLAY and calls it as a scoring PLAY when it is not, the resultant penalty is that the player's stone is allowed to remain in play, but the player receives a loss of turn at the next PLAY. The player is not allowed to SET & SLIDE! with this PLAY, and the next player is allowed to PLAY. 2) If a player makes a legal PLAY and scores but fails to call the correct score, the resultant penalty is the same. If an opponent rewards the player as a result of the BOGUS score call, the points are returned; however, the player that gave the points will also receive a BOGUS stone, and suffer the same penalty. This is recognized as a BAILOUT. NOTE: If either scenario occurs as a player makes their last PLAY to attain SET & SLIDE! status, the player is not allowed to call SET & SLIDE! and loses the turn.

24e. Calling Points for an Opponent—The BIRDIE

If a player recognizes that an opponent has scored points with a given PLAY, but has failed to "call" said points and that player then takes it upon themselves to "call" the points or in some manner signal that there are points on the table, that player has committed a BIRDIE. If a player commits a BIRDIE, they receive a BOGUS stone and a loss of turn. The player that initially failed to recognize their points is not awarded the points.

24e. Playing Out of Turn

PLAYING out of turn is called a GUMP. It occurs when a player makes a PLAY when it is not their turn. The resultant penalty is a loss of turn(s). The stone that the player attempted to PLAY must be pulled and placed on the table in front of the player dots up and must be PLAYED at the first available opportunity, after the loss of two (2) turns. No other stone can be PLAYED until that stone has been put into play. Likewise, if a player pulls from the QUARRY out of turn, all stones pulled are placed dots up and the resultant penalty is the same.

24f. Drawing Too Many Stones at the Start of Play

If a player DRAWS more than five (5) stones into their TRAY, it is called a SMOKEY. Once a SMOKEY has been discovered, the player to the right of the player that committed the SMOKEY must randomly pull the extra stone(s) from the OVERDRAWN TRAY, without looking at them, and return them to the QUARRY. The player that commits this infraction is additionally given a BOGUS stone and loses a turn.

24g. Not Drawing Enough Stones at the Start of Play

If a player DRAWS less than five (5) stones into their TRAY, it is called an OTIS. Once an OTIS has been discovered, the player must pull from the QUARRY to get the correct number of stones in their TRAY. The player that commits an OTIS is additionally given a BOGUS stone and loses a turn.

24h. Touching Risked Points

In the BIGSTAKES5 game, a player is not allowed to touch the points they have RISKED once the RISK has been set. If a player is caught touching their RISKED points, the resultant penalty is a loss of turn, forfeiture of all points scored during the GAME, and elimination from the RISK scenario. Any RISKED points are still STAKED and in play for the opponents that also RISKED points.

24i. Calling a Locked Board When the Board is NOT Locked

If a player incorrectly determines that the board is LOCKED (SEE LOCKED BOARD) and calls it to the table, they lose two turns. They lose a turn in making the initial PASS instead of DRAWING from the QUARRY, and then are given a BOGUS stone resulting in a loss of PLAY when their turn comes around again. Additionally, if a player assumes that they have made a play to lock the board and call it to the table, the player receives a BOGUS stone and loss of turn.

24j. Getting Up from the Table

Players are allowed to request a brief intermission at the end of a GAME and/or MATCH. They may choose to be excused to exit the table, and may do so once permission has been granted. The player must return within five (5) minutes to avoid penalty. Players are not allowed to exit a BIGSTAKES5 table during a GAME without permission from the opponents at the table. In standard home play, the resultant penalty is a loss of turn. In tournament play, only a BIGSIX DOMINO Association Official can authorize a player's exit from the table. The excused player must be escorted to player's desired destination by a tournament official. If a player exits the table without the permission of an Official, the resultant penalty is immediate disqualification.

24k. Unnecessary Handling of the Point Chips

In BIGSTAKES5 tournament play, players are encouraged not to have excessive contact with the chips on the table.

25. Slapping/Slamming of Stones:

In BIGSTAKES5 tournament play, there shall be NO slamming and/or excessive slapping of the stones on the table. At no time should a player's playing of a stone be done in a manner that is demonstrative in nature. At no time should a player's placement of the stones be forceful enough to disrupt the LINE OF PLAY. Disruption of the LINE OF PLAY by way of demonstrative slamming constitutes a BOGUS. In BIGSTAKES5 tournament play, a player will first be given a warning for excessive slamming of the stones. If a player continues to disrupt play after having been warned, the player is subject to disqualification and immediate removal from the premises.

26. Stone Exposure:

If a stone is inadvertently exposed in a standard home game of BIGSTAKES5 play, the player has the opportunity to recover the stone as quickly as possible before a competitor sees the stone. If another competitor sees the stone, but the other two competitors do not, it is not the responsibility of the opponents to tell the remaining players at the table what stone was exposed.

In BIGSTAKES5 tournament play, all stones are to be placed in each player's STONE HOLDER. No stone is to be removed from the STONE HOLDER until it is ready to be PLAYED. If a player accidentally exposes a single stone the player must leave the stone exposed; the player receives a BOGUS stone; and the player is not allowed to make another PLAY before placing that stone in play, no matter how many turns the player loses. In the event a player manages to expose their entire TRAY, the TRAY is deemed "dead" and the player is unable to PLAY; this player additionally loses their points for the GAME.

In the event a player has the misfortune of having a stone flip during the course of DRAWING, the player must return the exposed stone to the pile and DRAW another.

27. If a Stone Falls from the Game Table:

In BIGSTAKES5 tournament play, if any player's stone falls off the table playing surface (whether it hits the floor or not) the player's TRAY is immediately deemed dead and the player is not permitted to make another PLAY during that GAME. This player additionally loses their points for the GAME.

A stone that falls from the table surface is not to be touched by any player. The stone is to be retrieved by a tournament official and examined for marks and/or damage. The judge reserves the right to stop the GAME and replace the stone, or restart the GAME with a new set of stones. All points earned during the current GAME and MATCH stand.

28. Taunting and Inappropriate Language:

In BIGSTAKES5 tournament play, at no time is taunting of an opponent allowed. Players should retain and exhibit a professional discourse and sportsmanship at all times. Taunting is grounds for disqualification from the tournament. Obscene and/or foul language may not be used at any time and is cause for forfeiture of a GAME or MATCH as determined by tournament officials.

29. Cheating:

At NO time is CHEATING permitted and tolerated in BIGSTAKES5. Cheating includes among other things: spectator interaction, communicating the value of one's TRAY to any opponent, attempting to or looking at an opponent's stones that are not in play, the hiding of stones during play, marking of the stones, or the unauthorized passing of any chips at any time to another player for ANY reason. In BIGSTAKES5 tournament play, if a player is exposed for cheating, that player and any accomplices to the act will be disqualified and removed from the premises immediately without compensation or a refund of the entry fee. Additional penalties may include disqualification from competing in future BIGSIX DOMINO Association sanctioned events.

30. A COUNT:

In the BIGSTAKES5 game, a COUNT occurs when a player feels a reconciliation of stones at the completion of a GAME is necessary. This COUNT may occur if any player has reason to suspect that there have been less than 28 total stones in play at any time during the GAME. If a stone is missing, the stone play will be reconstructed to determine the disposition of the missing stone. If the GAME cannot be reconstructed and or the missing stone cannot be located, the GAME will be declared FROZEN until a tournament official makes a determination as to the status of the GAME. Actions may include but not be limited to: counting the GAME as it stands, playing the GAME over, disqualification of one or more players from the GAME, MATCH or tournament.

31. Final Decisions:

In BIGSTAKES5 tournament play, all decisions are final and are the responsibility of the Table Official designated for the table and/or area. If there are issues that the Table Official cannot resolve, a Tournament Official will be summoned to review the issue. After review, the Table and Tournament Officials will make a ruling on the issue. Official rulings are final.

32. The BIGSTAKES5 Board:

The BIGSTAKES5 Board is composed of the following elements: STONE HOLDER, VAULT, RISK, REWARD, HOUSE, the QUARRY, and the BOGUS area. The board is arranged for the players to understand the game and the proper placement of each component as mentioned above. The board of the BIGSTAKES5 game has symbols that indicate the position where the game official will place the HOUSE CHIPS and any earned MONEY CHIPS. The HOUSE CHIPS are placed in every corner of the board in 4 colors: Blue, Pink, Gray, and White. The Official will place the colored point chips in the HOUSE prior to the starting of the MATCH. The VAULT is located in four positions where each player will place the chips they have accumulated during the course of play.

a. The VAULT

In the BIGSTAKES5 game, the players will accumulate points over the course of the GAMES played. As these points are accumulated, they are converted to permanent MONEY CHIPS. The VAULT is where a player's earned chips are held on the board. As the points in a player's VAULT grow, the player then has more MONEY CHIPS to RISK to try to ultimately become the "Winner".

b. RISK & REWARD

To take RISK is to STAKE earned MONEY CHIPS points into the RISK area of the board. The player that called SET & SLIDE! in the previous GAME is always the first to RISK their points. Additional players shall in succession of their playing position STAKE their desired RISK points in their designated RISK position. Based on the RISK of an opponent, a player may choose to RISK a lower amount, match the RISK of that opponent, or choose to raise the RISKED point total. A player may only RISK the points they have earned over the course of the GAME; and the initial RISKING of points must be concluded prior to the DRAWING of the stones. If a player does not have any points in the VAULT, that player may not RISK points. The player is, however, allowed to continue to PLAY as they attempt to accumulate MONEY CHIPS. The winner of the RISKED points is determined by the player with the most total points scored during the current GAME after all points have been calculated. The player that calls SET & SLIDE! may or may not be the point leader for that GAME. RISK points will be paid after the SET & SLIDE! maneuver has occurred.

c. HOUSE

The HOUSE section of the board is where a player's point chips for the GAME are stored. These chips are only used for the purposes of scoring and are given to one's opponent as they score. HOUSE CHIPS are paid to the player to the left of a given position and to the player that calls SET & SLIDE! as appropriate. NOTE: In the event that a player dispenses all of their HOUSE CHIPS, play may continue with the remaining two opponents assuming the responsibility of paying the player that was being paid by the player that ran out of HOUSE CHIPS.

d. The HOUSE BANK

The HOUSE BANK is where the chips are stored that are used to convert HOUSE CHIPS a player has earned to MONEY CHIPS.

e. BOGUS Stone Placement

The BOGUS stone is used to identify a player that has made a mistake during the course of play and to alert other players at the table that the player in play is to lose a turn at their next opportunity. The BOGUS stone is placed as indicated on the board.

33. The OFFICIAL SCOREBOARD:

The BIGSTAKES5 OFFICIAL SCORECARD is used as a verification tool to assist the players and tournament directors in the tracking of play during the course of a MATCH and tournament.

Player are to record the date and location as appropriate. For BIGSTAKES5 tournament play, the round of play, the tournament Officer and the Tournament Name are recorded.

Players are identified by the house color chip that is drawn at the beginning of a MATCH to determine seat positions and the players name is placed above the appropriate player position.

At the end of each GAME, a mark is placed in the "WIN" column of the player and then in the circle next to the GAME that was just played, that player's number is placed in the circle. From this point, players and officials, alike, are able to very quickly see which players have won a GAME and specifically which GAME that player won.

Additionally, each player's score is recorded at the end of the GAME by having each player record and initial their score for verification. This prevents a player from recording an inaccurate score to gain an advantage over one's opponents.

At the end of each GAME, each player's points are tallied. The player's score is determined by the grand total of points remaining after the net point amount is determined, based on the RISKED points and the points won during the GAME. The number of points a player has at the start of each GAME is the number from which a player establishes their new grand total for the next GAME. At the end of the 5-game set, each player is rewarded 50 bonus points for each GAME WIN to add to their Game 5 score. The sum of these numbers will represent the NET BANK number and that is the number the player will carry forward to the next round.

For example, let's suppose that at the start of a 5-game set or round one of a tournament, each player will begin with 250 points. Given it is the start of play, no one will have a game win. The player's name is written above the Player # and the Points and Game Wins are written above the House color. It shall be written as such for round 1: 250/(0).

Player 1 RISKS 25 points of their $250 MONEY CHIPS. This player wins 40 points and achieves SET & SLIDE! status. With the RISK win, the player has won an additional 75 points that was RISKED by the other players for a net gain of +115 points. That player's total score for the game is 365 points. Player 2 RISKS 25 points. This player wins 30 points during the GAME. The player did not win the RISK so they lose the 25 points RISKED and have a net gain of +5 points. That player's total score for the GAME is 255 points. Player 3 RISKS 25 points. This player wins 10 points during the GAME. The player did not win the RISK so they lose the 25 points RISKED and have a net loss of −15 points. That player's total score for the GAME is 235 points. Player 4 RISKS 25 points. This player does not score at all during the game. The player did not win the RISK so they lose the 25 points RISKED and have a net loss of −25 points. That player's total score for the game is 225 points. The same process occurs for Game 2, but now each player's starting point is based on where they stood at the end of Game 1.

Each player signs the SCORECARD under their column and the SCORECARD is turned into an official. In a tournament format, this will be the document that is used to issue a player MONEY CHIPS before the start of the next MATCH/GAME in the total amount that player has won for all GAMES played. Each player must verify their score by writing the score of that GAME and marking their initials in the appropriate area of the SCORECARD. The verification process assures all players of authentic and verifiable scores. In BIGSTAKES5 tournament play, a player's refusal to sign the scorecard without having a formal complaint or protest shall be just cause for forfeiture of all points, dismissal from the tournament, forfeiture of any proceeds due, and immediate dismissal from the premises. Additional penalties may be imposed by the BIGSIX DOMINO Association.

Figure 2:
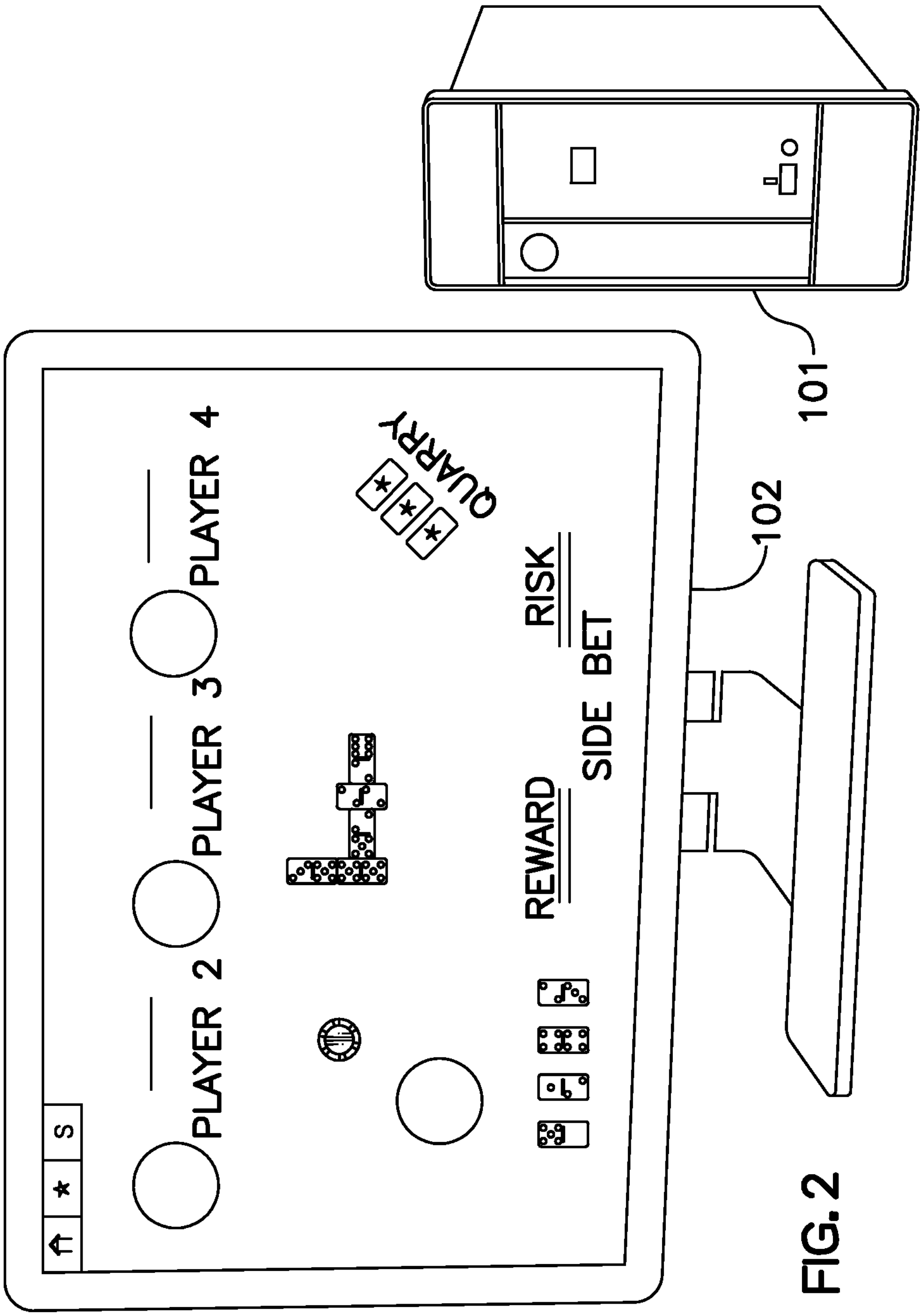
FIG. 2 is a perspective view of a computer version of the game.

FIG. 2 shows a version of the game of this invention as being played on a suitably programmed computer, here shown with an illustrative desk top computer unit 101 and an associated computer monitor or screen 102. This set is provided for one of the players, with the other players each being provided with respective screens or monitors. The mode of play is substantially the same as that described for the board or table-top version of FIG. 1, although variations may be possible.

The foregoing invention has been described in accordance with the relevant legal standards; thus, the description is exemplary rather than limiting in nature. Variations and modifications to the disclosed embodiments may become apparent to those skilled in the art and do come within the scope of the invention. Accordingly, the scope of legal protection afforded this invention can only be determined by studying the following claims.

What is claimed is:

1. A method of playing a domino match comprising a set of wagering rules in which players may participate in a risk, the match including a plurality of successive domino games, the domino match being played by a plurality of players upon a suitably programmed computer with a computer display that provides a game surface that is divided into respective individual playing areas each being associated with one of said players, and each said player's individual playing area including a point token holding area holding a predetermined set of point tokens at the beginning of each said game, a reward region, and a risk region; and a common play area surrounded by said individual playing areas; and with game pieces including a standard set of domino stones, each having dot markings on a face side and each having a back side, and a plurality of point tokens; the method comprising the steps of the computer turning over the set of domino stones so that the face sides thereof are concealed from the players;

playing a first domino game, with each player drawing a predetermined number of said domino stones from the turned-over domino stones displayed on said computer, the players in turn placing one or more of said domino stones in said common play area to build an array of said stones wherein the players in turn place a domino stone in line with an available end of a domino stone displayed in the array and adjacent therewith such that the dot marking of the domino stone being placed matches the dot marking of the available end of the domino stone; awarding points to one of the players upon a scoring event occurring at said one player's turn in said first domino game, said scoring event occurring based on the number of dots in the dot markings of the domino stone placed by such one of the players and the number of dots in the dot marking of said available end of the domino stone; said awarding points including moving one or more of said point tokens from the point token holding area of one the individual playing area associated with another one of the players to the rewards region of the individual playing area associated with said one player; terminating said first domino game upon a predetermined condition being reached; determining a winner of the first domino game from among said plurality of players; and each of the remaining players passing one or more of said point tokens from the point token holding areas of the individual playing area of the respective other players to the rewards area of the individual playing area of said winner of the first domino game; and playing a subsequent domino game.

2. A method as set forth in claim 1 wherein said players each exchange any of said point tokens won during the first domino game for point chips of similar value but which bear markings distinctively different from said point tokens, and said playing of a subsequent domino game includes one or more of said players moving at least one of said point chips, that were received in exchange for the point tokens awarded in a previous domino game, onto the risk region of such individual playing area of the respective player to effect a side wager.

3. A method as set forth in claim 2, said subsequent domino game further including the step of declaring a winner of said side wager, the winner being the player awarded the greatest total points on the point tokens moved into such player's rewards area in the subsequent domino game.

4. A method as set forth in claim 3 further comprising setting a predetermined game points value, and declaring as a game winner the player awarded points greater than said predetermined game points value in such domino game.

5. A method as set forth in claim 4 further comprising declaring as a match winner the player winning the greatest number of domino games in said match.

6. A method as set forth in claim 4 further comprising declaring as a match winner the player having been awarded the greatest number of points in said domino games and from said side wagers.

7. A method as set forth in claim 1 wherein said point tokens include house tokens which are placed in the point token holding areas at the commencement of each domino game, and a plurality of point chips, and comprising at the end of each said domino game exchanging for each player the house tokens from the rewards region for a like point value of said point chips, and returning said house tokens to the respective point token holding areas.

8. A method as set forth in claim 7 wherein the house tokens in each of the respective point token holding areas are of respective different colors corresponding to the associated individual playing areas.

9. A method as set forth in claim 8 wherein said point chips are a color different from any of said house tokens.

10. A method as set forth in claim 8 wherein said house tokens are in values that are increments of five points, and each said domino game commences with the respective point token holding areas containing house chips equaling a predetermined value of between 50 and 500 points.

11. A method as set forth in claim 8 wherein said passing of one or more point tokens includes passing said house tokens to said one player from the individual playing area of the player to one side of said one player.

12. A method as set forth in claim 1 wherein the domino stones each have two ends on the face side thereof and each end contains between zero dots and six dots.

13. A method as set forth in claim 12 wherein said players build said array of said domino stones by placing each domino stone in a line with one end matching the number of dots at the end of a domino stone previously played, and said scoring event occurs when the number of dots at the end of the domino stone placed by said player and the number of dots at the end of a line of previously played domino stones total a number that equals a predetermined number.

14. A method as set forth in claim 13 wherein said predetermined value is an integral multiple of five.

15. A method as set forth in claim 12 wherein at the commencement of play each player draws a predetermined number of stones to hold on the player's individual playing area, and said players place said stones in turn, and wherein the game winner is determined as the player to have placed all the drawn stones from the player's individual playing area.

16. A method as set forth in claim 15 wherein at the end of each said domino game, each of the remaining players move, from the point token holding area of each such player to the individual playing area of said game winner, a number of point tokens having a value corresponding to the number of dots on unplayed domino stones remaining in the individual playing area of the respective remaining player.

17. A method as set forth in claim 16 wherein the point token value passed by each of said remaining players is calculated as five (5) points for each said unplayed stone having between zero and seven dots, and ten (10) points for each said unplayed stone having between eight and twelve dots.

18. A method as set forth in claim 1 wherein said playing of a subsequent domino game includes one or more of said players moving at least one of said point tokens awarded in a previous domino game onto the risk region of the individual playing area of the respective player to effect a side wager.

* * * * *